(12) United States Patent  
Takii et al.

(10) Patent No.: US 11,639,848 B2  
(45) Date of Patent: May 2, 2023

(54) EYEGLASS FRAME SHAPE MEASUREMENT DEVICE AND LENS PROCESSING DEVICE

(71) Applicant: NIDEK CO., LTD., Aichi (JP)

(72) Inventors: Michihiro Takii, Aichi (JP); Kyoji Takeichi, Aichi (JP); Yuya Nakako, Aichi (JP); Takaaki Matsui, Aichi (JP); Mattia Minozzi, Albignasego (IT); Nicola Codogno, Albignasego (IT); Federico Carraro, Albignasego (IT)

(73) Assignee: NIDEK CO., LTD., Aichi (JP)

( * ) Notice: Subject to any disclaimer, the term of this patent is extended or adjusted under 35 U.S.C. 154(b) by 244 days.

(21) Appl. No.: 17/034,777

(22) Filed: Sep. 28, 2020

(65) Prior Publication Data

US 2021/0095953 A1 Apr. 1, 2021

(30) Foreign Application Priority Data

Sep. 30, 2019 (JP) .............................. JP2019-178174

(51) Int. Cl.
*G01B 11/24* (2006.01)
*G01B 5/20* (2006.01)

(52) U.S. Cl.
CPC ................ *G01B 11/24* (2013.01); *G01B 5/20* (2013.01)

(58) Field of Classification Search
CPC ...... G01B 11/24; G01B 5/20; G01B 11/2518; B24B 9/14; B24B 49/12
See application file for complete search history.

(56) References Cited

U.S. PATENT DOCUMENTS

| 6,122,063 A | 9/2000 | Berndt et al. |
| 2003/0191603 A1 | 10/2003 | Raab et al. |

(Continued)

FOREIGN PATENT DOCUMENTS

| DE | 10 2006 050 838 A1 | 9/2007 | |
| DE | 3663708 A1 * | 6/2018 | ............. G01B 11/24 |

(Continued)

OTHER PUBLICATIONS

Extended European Search Report dated Feb. 18, 2021, issued by the European Patent Office in counterpart European Application No. 20199037.1.

*Primary Examiner* — Tarifur R Chowdhury
*Assistant Examiner* — Larry Robert Botkin
(74) *Attorney, Agent, or Firm* — Sughrue Mion, PLLC

(57) ABSTRACT

An eyeglass frame shape measurement device includes an optical measurement unit, a probe unit, a holding unit that holds the optical measurement unit and the probe unit, a changing portion that integrally moves the optical measurement unit and the probe unit with respect to an eyeglass frame to change a measurement position with respect to a groove of a rim of the eyeglass frame, and a controller that controls an operation of the eyeglass frame shape measurement device. The controller controls an operation of the changing portion to measure the groove of the rim of the eyeglass frame, acquires a cross-sectional shape of the groove of the rim of the eyeglass frame based on a detection result detected by the optical measurement unit, and acquires a shape of the rim of the eyeglass frame based on a detection result detected by the probe unit.

8 Claims, 12 Drawing Sheets

(56) References Cited

U.S. PATENT DOCUMENTS

| | | | |
|---|---|---|---|
| 2009/0064512 A1* | 3/2009 | Matsuyama | G01B 5/0004 33/28 |
| 2014/0059871 A1 | 3/2014 | Yamamoto | |
| 2020/0158496 A1* | 5/2020 | Takii | B24B 9/14 |

FOREIGN PATENT DOCUMENTS

| | | | | |
|---|---|---|---|---|
| JP | 2001519025 A | 10/2001 | | |
| WO | 2019/026416 A1 | 2/2019 | | |
| WO | WO-2019026416 A1 * | 2/2019 | | B24B 9/14 |

* cited by examiner

EYEGLASS FRAME SHAPE MEASUREMENT DEVICE AND LENS PROCESSING DEVICE

CROSS-REFERENCE TO RELATED APPLICATION

This application claims priority from Japanese Patent Application No. 2019-178174 filed on Sep. 30, 2019, the entire subject-matter of which is incorporated herein by reference.

TECHNICAL FIELD

The present disclosure relates to an eyeglass frame shape measurement device for obtaining a shape of an eyeglass frame, and a lens processing device for processing a peripheral edge of a lens using the eyeglass frame shape measurement device.

BACKGROUND

There is known an eyeglass frame shape measurement device that measures a shape of a groove of a rim of an eyeglass frame by irradiating the groove of the rim of the eyeglass frame with a measurement light flux and detecting the reflected light flux reflected by the groove (for example, refer to JP-A-2001-519025). Based on the rim measurement result (trace data) obtained by the eyeglass frame shape measurement device, a shape (target shape) for fitting the eyeglass lens to the rim is obtained. In addition, the contour shape of the eyeglass lens is determined based on the shape, and the peripheral edge of the lens is processed by an eyeglass lens processing device.

Incidentally, in order to excellently frame the processed lens into the eyeglass frame, it is considered that the shape of the rim and the contour shape of the processed lens are preferably close to each other. However, in the optical measurement by the device as described above, in some cases, it is difficult to acquire excellent measurement result due to various reasons, such as occurrence of distortion in the reflected light flux from the groove of the rim of the eyeglass frame due to the influence of the change in the incident angle of the measurement light flux with respect to the groove of the rim, inability to excellently detect the reflected light flux while the groove of the rim cannot be excellently irradiated with the measurement light flux depending on a measurement position in the eyeglass frame, inability to excellently detect the reflected light flux due to weakness of light quantity of the reflected light flux reflected by the groove of the rim depending on the type of the eyeglass frame, and the like.

SUMMARY

An object of the present disclosure is to provide an eyeglass frame shape measurement device that can easily and excellently acquire shape information of a rim of an eyeglass frame, and a lens processing device.

There is provided with an eyeglass frame shape measurement device that measures a shape of an eyeglass frame, including:
 an optical measurement unit including a light projecting optical system that emits a measurement light flux from a light source toward a groove of a rim of an eyeglass frame, and a light receiving optical system that causes a first detector to receive a reflected light flux of the measurement light flux emitted toward the groove of the rim of the eyeglass frame by the light projecting optical system and reflected by the groove of the rim of the eyeglass frame;
 a probe unit including a probe to be pressed against the groove of the rim of the eyeglass frame and a second detector that detects a position of the probe;
 a holding unit that holds the optical measurement unit and the probe unit;
 a changing portion that includes an actuator and drives the actuator to integrally move the optical measurement unit and the probe unit with respect to the eyeglass frame by moving the holding unit with respect to the eyeglass frame, to change a measurement position with respect to the groove of the rim of the eyeglass frame; and
 a controller that controls an operation of the eyeglass frame shape measurement device,
 in which the controller
  controls an operation of the changing portion to measure the groove of the rim of the eyeglass frame,
  acquires a cross-sectional shape of the groove of the rim of the eyeglass frame based on a detection result detected by the first detector, and
  acquires a shape of the rim of the eyeglass frame based on a detection result detected by the second detector.
There is provided with a lens processing device that processes a peripheral edge of a lens, including:
 a processing controller that processes a peripheral edge of a lens based on a cross-sectional shape of a groove of a rim of an eyeglass frame and a shape of the rim, which are acquired by the above eyeglass frame shape measurement device.

DETAILED DESCRIPTION

Figure 1:
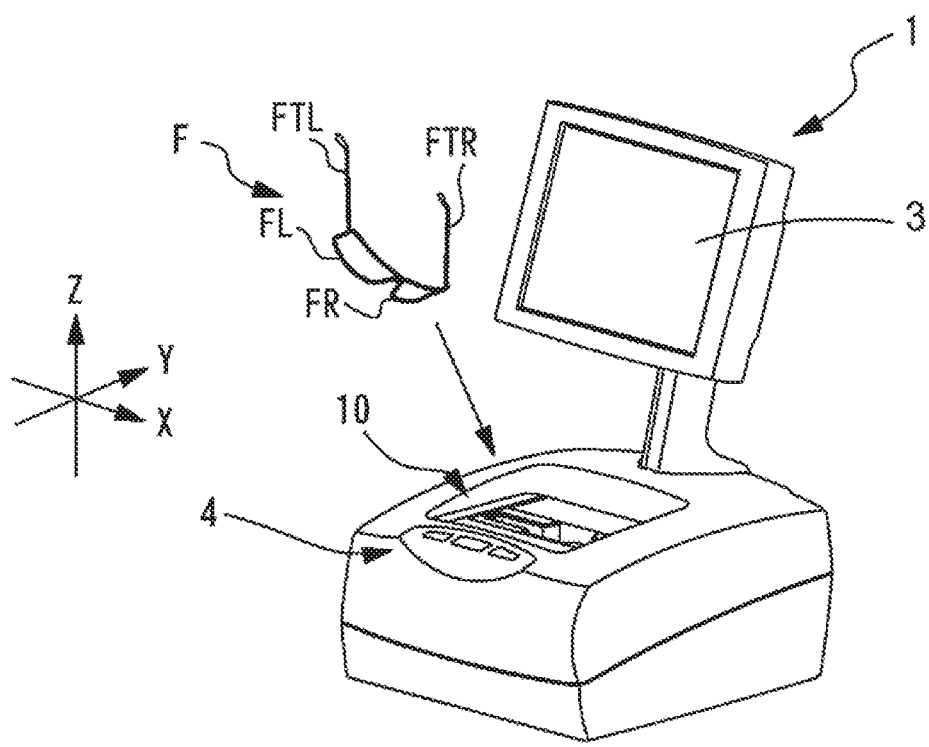
FIG. 1 is a schematic external view of an eyeglass frame shape measurement device.

Hereinafter, the present embodiment will be described below with reference to the drawings. FIGS. 1 to 13 are views describing a configuration of an eyeglass frame shape measurement device (for example, eyeglass frame shape measurement device 1) according to an embodiment. In the present embodiment, a depth direction of the eyeglass frame shape measurement device is referred to as a Y direction, a horizontal direction on a plane orthogonal to the depth direction is referred as an X direction, and a perpendicular direction is referred to as a Z direction. In the items classified by < >below can be used independently or in association with each other.

In the eyeglass frame shape measurement device according to the present embodiment, a rim part of an eyeglass frame F is disposed in a state of being downward and a temple part of the eyeglass frame F is disposed in a state of being upward. In other words, in a case where the eyeglass frame F is disposed in the eyeglass frame shape measurement device, left and right rims FL and FR of the eyeglass frame F are downward, and left and right temples FTL and FTR of the eyeglass frame F are upward. In the eyeglass frame shape measurement device according to the present embodiment, a configuration in which the rim part of the eyeglass frame F is disposed in a state of being downward and the temple part of the eyeglass frame F is disposed in a state of being upward has been described as an example, but it is needless to say that the present disclosure is not limited thereto. For example, a configuration in which the rim part of the eyeglass frame F is disposed in a state of being upward and the temple part of the eyeglass frame F is disposed in a state of being downward may be employed. In addition, for example, in a case where the eyeglass frame F is disposed in the eyeglass frame shape measurement device, a configuration in which the upper ends of the left and right rims FL and FR of the eyeglass frame F are disposed to be downward, and the lower ends of the left and right rims FL and FR of the eyeglass frame F are disposed to be upward may be employed. In addition, for example, in a case where the eyeglass frame F is disposed in the eyeglass frame shape measurement device, a configuration in which the upper ends of the left and right rims FL and FR of the eyeglass frame F are disposed to be upward, and the lower ends of the left and right rims FL and FR of the eyeglass frame F are disposed to be downward may be employed.

Overview

An overview of the eyeglass frame shape measurement device (for example, eyeglass frame shape measurement device 1) according to an embodiment of the present disclosure will be described. For example, the eyeglass frame shape measurement device measures a shape of an eyeglass frame. For example, the eyeglass frame shape measurement device includes an optical measurement unit (for example, optical measurement unit 30). For example, the optical measurement unit optically measures a cross-sectional shape of a groove of a rim of the eyeglass frame in a non-contact manner. For example, the eyeglass frame shape measurement device includes a probe unit (for example, probe unit 60). For example, the probe unit measures a shape of the rim of the eyeglass frame (in a contact manner) by bringing the probe (for example, probe 61) into contact with the groove on the eyeglass frame.

For example, the optical measurement unit includes a light projecting optical system (for example, light projecting optical system 30a) and a light receiving optical system (for example, light receiving optical system 30b). For example, the light projecting optical system includes a light source (for example, light source 31). For example, the light projecting optical system emits a measurement light flux from the light source toward the groove of the rim of the eyeglass frame. For example, at least one light source may be used as the light source. For example, one light source may be used. In addition, for example, a plurality of light sources may be used. For example, the light receiving optical system includes a first detector (for example, detector 37). For example, the light receiving optical system receives a reflected light flux of the measurement light flux which is emitted toward the groove of the rim of the eyeglass frame by the light projecting optical system and reflected by the groove of the rim of the eyeglass frame, by the first detector. For example, at least one detector may be used as the first detector. For example, one detector may be used. For example, a plurality of detectors may be used.

For example, the light projecting optical system and the light receiving optical system can be disposed at any position as long as the light projecting optical system and the light receiving optical system have a positional relationship capable of acquiring the cross-sectional shape. For example, both the light projecting optical system and the light receiving optical system may be collectively disposed on one side of the probe unit (for example, the probe). Further, for example, both the light projecting optical system and the light receiving optical system may be separately disposed (for example, the light projecting optical system is disposed on the left side of the probe unit and the light receiving optical system is disposed on the right side of the probe unit) on both sides of the probe unit. It is needless to say that the light projecting optical system and the light receiving optical system may be disposed at positions different from the above. For example, the light projecting optical system and the light receiving optical system may be disposed above or below the probe unit. It is needless to say that the light projecting optical system and the light receiving optical system may be disposed at a position (for example, upper left side, upper right side, lower left side, and lower right side) which is a combination of any of the above-described disposition positions.

For example, the probe unit includes a probe. For example, the probe is pressed against the groove of the rim of the eyeglass frame. For example, the probe unit includes a second detector (for example, motor 225, motor 235, motor 245, encoder 265a, encoder 286, and encoder 288). For example, the second detector detects the position of the probe. For example, at least one detector may be used as the second detector. For example, one detector may be used. For example, a plurality of detectors may be used.

For example, the eyeglass frame shape measurement device includes a holding unit (for example, holding unit 25) that holds the optical measurement unit and the probe unit.

For example, the eyeglass frame shape measurement device includes a changing portion (for example, movement unit 210 and rotation unit 260). For example, the changing portion integrally moves the optical measurement unit and the probe unit with respect to the eyeglass frame by moving the holding unit with respect to the eyeglass frame, to change the measurement position with respect to the groove of the rim of the eyeglass frame.

For example, the eyeglass frame shape measurement device includes a controller (for example, controller 50). For example, the controller controls the operation of the eyeglass frame shape measurement device. For example, the controller may control the operation of the eyeglass frame shape measurement device by one controller. For example, the controller may include a plurality of controllers and control the operation of the eyeglass frame shape measurement device by the plurality of controllers.

For example, the controller performs the measurement of the groove of the rim of the eyeglass frame by controlling the operation of the changing portion. For example, the controller acquires the cross-sectional shape of the groove of the rim of the eyeglass frame based on the detection result detected by the first detector. Further, for example, the controller acquires the shape of the rim of the eyeglass frame based on the detection result detected by the second detector.

As described above, for example, in the present embodiment, the eyeglass frame shape measurement device includes the optical measurement unit including the light projecting optical system that emits the measurement light flux from the light source toward the groove of the rim of the eyeglass frame, and the light receiving optical system that receives the reflected light flux of the measurement light flux emitted toward the groove of the rim of the eyeglass frame by the light projecting optical system and reflected by the groove of the rim of the eyeglass frame, and the probe unit including the probe to be pressed against the groove of the rim of the eyeglass frame and the second detector that detects the position of the probe. In addition, for example, in the present embodiment, the eyeglass frame shape measurement device includes the holding unit that holds the optical measurement unit and the probe unit, the changing portion that integrally moves the optical measurement unit and the probe unit with respect to the eyeglass frame by moving the holding unit with respect to the eyeglass frame, to change the measurement position with respect to the groove of the rim of the eyeglass frame, and the controller that controls an operation of the eyeglass frame shape measurement device. Further, in the present embodiment, in the eyeglass frame shape measurement device, the controller controls an operation of the changing portion to measure the groove of the rim of the eyeglass frame, acquires the cross-sectional shape of the groove of the rim of the eyeglass frame based on the detection result detected by the first detector, and acquires the shape of the rim of the eyeglass frame based on the detection result detected by the second detector. With such a configuration, for example, compared to a configuration in which a holding unit that holds the probe unit and a holding unit that holds the optical measurement unit are respectively provided and the holding units are respectively movable with respect to the eyeglass frame, an extra configuration or complicated control becomes unnecessary since it is possible to integrally move the optical measurement unit and the probe unit with respect to the eyeglass frame by moving the holding unit which is one unit. Accordingly, it is possible to perform the measurement of the optical measurement unit and the probe unit with a simple configuration. In addition, since it is possible to acquire both the measurement result measured by the probe unit and the measurement result measured by the optical measurement unit, it is possible to combine each measurement result to acquire more excellent rim shape information.

For example, the optical measurement unit and the probe unit may perform the measurement at the same timing when performing the measurement respectively. Further, for example, the optical measurement unit and the probe unit may perform the measurement at different timings. In addition, for example, the optical measurement unit and the probe unit may perform the measurement by combining the measurement at the same timing and the measurement at different timings.

For example, the eyeglass frame shape measurement device may include a movement portion (for example, rotation unit 260) for making the probe movable with respect to the holding unit. Further, for example, the eyeglass frame shape measurement device may include a movement portion for making the optical measurement unit movable with respect to the holding unit. For example, the movement portion for making the probe movable with respect to the holding unit may have a configuration capable of moving at least the probe in the probe unit. For example, in addition to the probe, the second detector may also be movable with respect to the holding unit.

As described above, for example, in the eyeglass frame shape measurement device, the movement portion for making the probe movable with respect to the holding unit may further be provided, and the optical measurement unit may be integrally moved together with the probe with respect to the holding unit as the optical measurement unit is connected to the probe unit and the probe is moved with respect to the holding unit. In this manner, for example, compared to a configuration in which the probe unit and the optical measurement unit are respectively movable with respect to the holding unit, by connecting the optical measurement unit to the probe, an extra configuration or complicated control becomes unnecessary, and it is possible to make the eyeglass frame shape measurement device a device having a simpler configuration. Further, compared to a configuration in which the probe unit and the optical measurement unit are respectively movable with respect to the holding unit, by connecting the optical measurement unit to the probe, it is possible to save space. Therefore, it is possible to prevent the probe unit and the optical measurement unit from interfering with each other during the measurement of the eyeglass frame and making the measurement difficult.

Further, for example, in a case of the optical measurement unit, since the measurement is performed without coming into contact with the groove of the rim, there is a case where it becomes difficult to align the optical measurement unit with the groove of the rim. With the above configuration, for example, the optical measurement unit can move integrally with the movement of the probe that moves along the groove of the rim, and thus, it becomes easy to align the optical measurement unit with the groove of the rim, and it is possible to excellently perform the measurement.

For example, as a configuration in which the optical measurement unit is connected to the probe unit, the optical measurement unit may be connected to the probe part. Further, for example, as a configuration in which the optical measurement unit is connected to the probe unit, the optical measurement unit may be connected to a probe shaft (for example, probe shaft 62) that supports the probe. For example, it is needless to say that the configuration in which the optical measurement unit is connected to the probe unit is not limited to the above configuration. For example, as a configuration in which the optical measurement unit is connected to the probe unit, a configuration in which the optical measurement unit is connected to the holding unit such that the optical measurement unit is integrally movable together with the probe as the probe moves with respect to the holding unit may be employed.

For example, at least a part of the configuration of the movement portion may be used for both of the movement portion for making the probe movable with respect to the holding unit and the movement portion for making the optical measurement unit movable with respect to the holding unit. Further, for example, the movement portion for making the probe movable with respect to the holding unit and the movement portion for making the optical measurement unit movable with respect to the holding unit may be separately provided. In this case, since the probe and the optical unit are respectively movable with respect to the holding unit, finer control becomes possible.

For example, the optical measurement unit and the probe unit may be configured to be capable of measuring the same measurement position. In other words, for example, the optical measurement unit and the probe unit may be configured such that the measurement by the optical measurement unit and the measurement by the probe unit can be performed at the same timing with respect to the same measurement position.

In addition, for example, the optical measurement unit and the probe unit may be configured to be capable of measuring different measurement positions. In other words, for example, the optical measurement unit and the probe unit may be configured such that the measurement by the optical measurement unit and the measurement by the probe unit can be performed at the same timing with respect to different measurement positions. In this case, for example, the probe unit and the optical measurement unit may be disposed such that a first measurement position which is a measurement position of the groove of the rim by the optical measurement unit and a second measurement position which is a measurement position of the groove of the rim by the probe unit are measurable as different measurement positions. With such a configuration, the optical measurement unit and the probe unit measure different measurement positions at the same timing. For example, in a case where the probe unit and the optical measurement unit simultaneously measure the same measurement position, the measurement light flux from the optical measurement unit may be blocked by the probe, and there is a case where the measurement by the optical measurement unit becomes difficult. According to the configuration of the present disclosure, since the probe unit and the optical measurement unit can measure different measurement positions, it is possible to prevent blocking of the measurement light flux by the probe, and to excellently perform the measurement.

For example, as a configuration capable of measuring different measurement positions, a configuration capable of measuring adjacent positions may be used. In this case, for example, the probe unit and the optical measurement unit may be disposed such that the first measurement position (for example, first measurement position T) which is a measurement position of the groove of the rim by the optical measurement unit and a second measurement position (for example, second measurement position S) which is a measurement position of the groove of the rim by the probe unit are measured as adjacent measurement positions. With such a configuration, for example, the optical measurement unit and the probe unit can measure closer (adjacent) measurement positions. For example, in a case where the measurement position between the optical measurement unit and the probe unit is largely displaced, there is a case where the measurement becomes difficult. As an example, for example, when one of the optical measurement unit and the probe unit approaches a curved part (for example, the nose side part and the ear side part) of the eyeglass frame, the other one is positioned above or below the eyeglass frame. In this cases, there is a case where the measurement cannot proceed and the measurement becomes difficult. According to the configuration of the present disclosure, it becomes possible to measure the measurement position by the optical measurement unit and the measurement position by the probe unit as closer (adjacent) measurement positions, and thus it becomes possible to prevent the measurement from becoming difficult (for example, the groove of the rim is not excellently irradiated with the measurement light flux as the measurement light flux is displaced in the XYZ directions), and to excellently perform the measurement.

Further, for example, in a case where the measurement position between the optical measurement unit and the probe unit is largely displaced, there is a case where it becomes difficult to excellently acquire the measurement. As an example, for example, there is a part where the angle of the groove of the rim differs depending on the position of the eyeglass frame, and for example, the angle of the groove of the rim at one measurement position of the optical measurement unit and the probe unit, and the angle of the groove of the rim at the other measurement position are different from each other. Accordingly, there is a case where the groove of the rim cannot be excellently irradiated with the measurement light flux by the optical measurement unit, and it becomes difficult to excellently acquire the measurement result. According to the configuration of the present disclosure, since it becomes possible to measure the measurement position by the optical measurement unit and the measurement position by the probe unit as closer (adjacent) measurement positions, the groove of the rim can be excellently irradiated with the measurement light flux by the optical measurement unit, and it is possible to acquire excellent measurement result.

Further, for example, in a case where the measurement position between the optical measurement unit and the probe unit is largely displaced, there is a case where it becomes difficult to associate the measurement results acquired by the optical measurement unit and the probe unit, respectively. As an example, there is a configuration in which the groove of the rim is partially inclined depending on the type of the eyeglass frame. In a case of measuring such an eyeglass frame, there is a case where one of the optical measurement unit and the probe unit measures the position at which the groove of the rim is inclined and the other one measures the position at which the groove of the rim is not inclined, and it becomes difficult to grasp which groove of the rim is being measured in the eyeglass frame. Therefore, in a case where the measurement results are acquired by both the optical measurement unit and the probe unit, it becomes difficult to grasp the relationship between the measurement results of both the optical measurement unit and the probe unit, and there is a case where the association becomes difficult. According to the configuration of the present disclosure, since it becomes possible to measure the measurement position by the optical measurement unit and the measurement position by the probe unit as closer (adjacent) measurement positions, it is possible to acquire the measurement result at substantially the same measurement position, and it becomes easy to grasp the relationship between the measurement results of both the optical measurement unit and the probe unit. Therefore, the respective measurement results acquired by the optical measurement unit and the probe unit can be excellently associated with each other.

It is needless to say that, for example, the configuration capable of measuring different measurement positions is not limited to the configuration capable of measuring adjacent positions. For example, as a configuration capable of measuring different measurement positions, a configuration capable of measurement positions separated from each other may be used.

For example, in a case where the optical measurement unit and the probe unit are capable of measuring different measurement positions, the measurement by the optical measurement unit may be performed before the measurement by the probe unit in the measurement proceeding direction. In this case, for example, the first measurement position of the optical measurement unit may be a measurement position preceding the second measurement position by the probe unit in the measurement proceeding direction. With such a configuration, for example, since the information of the measurement position measured by the probe is acquired from the measurement result by the optical measurement unit i advance, in a case where the measurement is performed by the probe unit with respect to the measurement position at which the measurement is completed by the optical measurement unit, it becomes easy to adjust the position of the probe with respect to the eyeglass frame based on the measurement result by the optical measurement unit. Accordingly, it is possible to prevent the probe from coming out of the groove of the eyeglass frame, and to prevent the probe from being measured in a state of not being accurately inserted in the groove of the rim.

For example, since the cross-sectional shape of the groove of the rim can be acquired in the measurement by the optical measurement unit, the state (for example, the inclination of the groove, and the depth of the groove) of the groove of the rim is easily grasped. Therefore, it is easy to more excellently perform the position adjustment with respect to the eyeglass frame compared to the configuration in which the position of the optical measurement unit is adjusted based on the measurement result of the probe unit.

Further, for example, in a case where the optical measurement unit and the probe unit are capable of measuring different measurement positions, the measurement by the probe unit may be performed before the measurement by the optical measurement unit in the measurement proceeding direction. In this case, for example, the second measurement position of the probe unit may be a measurement position preceding the first measurement position by the optical measurement unit in the measurement proceeding direction.

For example, the optical axis (for example, optical axis L1) of the light projecting optical system in the optical measurement unit may be disposed to be inclined on the radial plane (XY plane) with respect to the measuring axis (for example, measuring axis L3) extending from the probe toward the measurement position of the groove of the rim of the eyeglass frame. In other words, for example, the optical axis of the light projecting optical system in the optical measurement unit may be disposed to be inclined by a predetermined inclination angle (for example, inclination angle β) on the radial plane with respect to the measuring axis extending from the probe toward the measurement position of the groove of the rim of the eyeglass frame. In this case, for example, the light projecting optical system may be disposed such that an angle made by the optical axis in which the groove of the rim of the eyeglass frame is irradiated with the measurement light flux in the light projecting optical system and the measuring axis extending from the probe toward the measurement position of the groove of the rim of the eyeglass frame on the radial plane becomes an acute angle. With such a configuration, for example, it becomes easy to set the measurement position by the probe unit and the measurement position by the optical measurement unit as adjacent positions or the same position. Further, for example, compared to a configuration in which the measuring axis of the probe unit and the optical axis of the light projecting optical system in the optical measurement unit are disposed in parallel, it becomes easier to set the measurement position by the probe unit and the measurement position by the optical measurement unit as adjacent positions.

For example, the controller may associate the cross-sectional shape of the groove of the rim with the shape of the rim based on first position information regarding a measurement position by the optical measurement unit and second position information regarding a measurement position by the probe unit. The associated cross-sectional shape of the groove of the rim and the associated shape of the rim are acquired by measuring at an identical measurement position with respect to the groove of the rim of the eyeglass frame. In other words, the measurement result by the optical measurement unit and the measurement result by the probe unit may be associated with each other based on the first position information and the second position information. With such a configuration, it becomes possible to easily associate the measurement result measured by the probe unit and the measurement result measured by the optical measurement unit with each other, and it is possible to acquire more excellent rim shape information.

For example, the first position information and the second position information may be displacement information between the measurement positions (for example, displacement amount ΔD). In this case, for example, as the first position information and the second position information, in advance, the displacement information (the displacement amount between the first position information and the second position information) of the measurement positions such as the measurement position by the optical measurement unit and the measurement position by the probe may be acquired. Further, for example, as the first position information and the second position information, the displacement information between the measurement positions may be acquired based on the first position information and the second position information detected at the time of measurement.

Further, for example, the first position information and the second position information may be position coordinates of the measurement position. In this case, for example, as the first position information and the second position information, a first position coordinate indicating the measurement position of the optical measurement unit detected at the time of measurement and a second position coordinate indicating the measurement position of the probe unit may be acquired.

For example, the controller may acquire integrated rim shape data by associating the cross-sectional shape of the groove of the rim acquired by the optical measurement unit and the shape of the rim measured by the probe unit with each other. For example, by acquiring the integrated rim shape data, more detailed information on the rim can be acquired, and thus, the lens can be processed based on the detailed information on the rim, and the lens can be processed to a shape that can be more excellently fitted into the eyeglass frame.

In the present disclosure, a configuration in which the eyeglass frame shape measurement device includes the holding unit that holds the optical measurement unit and the probe unit has been described as an example, but the disclosure is not limited thereto. For example, a configuration may be employed in which a holding unit that holds the probe unit and a holding unit that holds the optical measurement unit are respectively provided and are respectively movable with respect to the eyeglass frame. In this case, for example, the eyeglass frame shape measurement device may include a first holding unit that holds the probe unit and a second holding unit that holds the optical measurement unit, and may include the changing portion for changing for changing each measurement position with respect to the optical measurement unit, the probe unit, and the groove of the rim of the eyeglass frame by moving each of the first holding unit and the second holding unit with respect to the eyeglass frame. Furthermore, the eyeglass frame shape measurement device may include a first movement portion for making the probe movable with respect to the first holding unit and a second movement portion for making the optical measurement unit movable with respect to the second holding unit.

Hereinafter, each configuration will be described in more detail.

Light Projecting Optical System

For example, the light projecting optical system in the optical measurement unit may include an optical member. In this case, for example, the measurement light flux emitted from the light source may be emitted toward the groove of the rim of the eyeglass frame via each optical member. For example, as the optical member, at least one of a lens, a mirror, a diaphragm, and the like may be used. For example, the focal depth can increase by using the diaphragm. It is needless to say that the optical member is not limited to the above-described optical member, and different optical members may be used.

For example, the light projecting optical system may be configured such that the measurement light flux emitted from the light source is emitted toward the groove of the rim of the eyeglass frame. For example, a configuration having the light source at least may be employed. Further, for example, the light projecting optical system may be configured such that the measurement light flux emitted from the light source is emitted toward the groove of the rim of the eyeglass frame via a member different from the optical member.

For example, the measurement light flux emitted toward the groove of the rim of the eyeglass frame by the light projecting optical system may be a measurement light flux having a spot-like shape. Further, for example, the measurement light flux emitted toward the groove of the rim of the eyeglass frame by the light projecting optical system may be a measurement light flux having a width (for example, a measurement light flux having a slit-like shape). In this case, for example, the light projecting optical system may emit the measurement light flux from the light source toward the groove of the rim of the eyeglass frame and form a light cut surface on the groove of the rim. For example, the light receiving optical system may receive the reflected light flux (for example, scattered light, regular reflected light, and the like) of the groove of the rim acquired by reflection (for example, scattering, regular reflection, and the like) by the light cut surface on the groove of the rim, by the detector.

For example, in a case of emitting the measurement light flux having a width, a light source that emits a slit-like light flux may be used. For example, a point light source may be used. In this case, for example, a plurality of point light sources may be disposed side by side to emit the measurement light flux having a width. Further, for example, the measurement light flux having a width may be emitted by scanning a spot-like light flux emitted from the point light source. In addition, for example, the measurement light flux having a width may be emitted by diffusing a spot-like measurement light flux emitted from the point light source by the optical member. It is needless to say that, for example, as the light source, various types of light sources different from the above-described light source may be used to emit the measurement light flux having a width.

Light Receiving Optical System

For example, the light receiving optical system in the optical measurement unit may include an optical member. In this case, for example, the reflected light flux of the measurement light flux reflected by the groove of the rim of the eyeglass frame may be received by the first detector via each optical member. For example, as the optical member, at least one of a lens, a mirror, a diaphragm, and the like may be used. It is needless to say that the optical member is not limited to the above-described optical member, and different optical members may be used.

For example, the light receiving optical system may be configured such that the reflected light flux of the measurement light flux reflected by the groove of the rim of the eyeglass frame is received by the detector. For example, a configuration in which the light receiving optical system has at least the first detector may be employed. Further, for example, the light receiving optical system may be configured such that the reflected light flux of the measurement light flux reflected by the groove of the rim of the eyeglass frame is received by the first detector via a member different from the optical member.

For example, in the present embodiment, an imaging optical axis (for example, imaging optical axis L2) of the light receiving optical system may be configured to be inclined downward by a predetermined inclination angle (for example, inclination angle α) in the Z direction with respect to the optical axis of the light projecting optical system. In addition, for example, in the present embodiment, the imaging optical axis of the light receiving optical system may be configured to be inclined by a predetermined inclination angle (for example, inclination angle θ) on the radial plane (XY plane) with respect to the optical axis of the light projecting optical system.

Probe Unit

For example, the probe unit includes a probe to be pressed against the groove of the rim of the eyeglass frame and the second detector that detects the position of the probe. For example, the second detector may have any configuration that can detect the position of the probe unit. In other words, for example, the second detector may have a configuration that can detect the position of the probe in a case where the probe has moved. In this case, for example, a configuration in which the position of the probe can be detected in a case where the probe has moved in at least one of the X direction, the Y direction, the Z direction, the rotation direction (rotation), and the inclination direction (inclination) may be employed.

Changing Portion

For example, the changing portion integrally moves the optical measurement unit and the probe unit with respect to the eyeglass frame by moving the holding unit with respect to the eyeglass frame, to change the measurement position with respect to the groove of the rim of the eyeglass frame. For example, the changing portion may be an X-direction changing portion that has an actuator (for example, a motor) and drives the actuator to move the position of the holding unit in the X direction. For example, the configuration for moving the position of the holding unit may be a Y-direction changing portion that has an actuator (for example, a motor) and drives the actuator to move the position of the holding unit in the Y direction.

For example, the configuration for moving the position of the holding unit may be a Z-direction changing portion that has an actuator (for example, a motor) and drives the actuator to move the position of the holding unit in the Z direction. For example, the configuration for moving the position of the holding unit may be a rotation changing portion (for example, the rotation unit 260) that has an actuator (for example, a motor) and drives the actuator to rotate the position of the holding unit. For example, the configuration for moving the position of the holding unit may be an inclination angle changing portion that has an actuator (for example, a motor) and drives the actuator to change the inclination angle of the holding unit.

Further, for example, the configuration for moving the position of the holding unit may be at least one of the X-direction changing portion, the Y-direction changing portion, the Z-direction changing portion, the rotation changing portion, and the inclination angle changing portion. It is needless to say that the configuration for moving the position of the holding unit is not limited to the above-described changing portion, and may be a configuration in which a changing portion for moving the position of the holding unit in a direction different from the above direction is used.

Controller

For example, the controller processes the reflected light flux of the measurement light flux reflected by the groove of the rim of the eyeglass frame, and acquires the cross-sectional shape of the groove of the rim of the eyeglass frame. For example, the controller may acquire the cross-sectional shape from a light receiving position of the reflected light flux in the first detector. For example, the cross-sectional shape may be an image (image data). In other words, the cross-sectional shape may be a cross-sectional image. In addition, for example, the cross-sectional shape may be a signal (signal data). In other words, the cross-sectional shape may be signal data of the cross-sectional shape.

For example, examples of the cross-sectional shape include a two-dimensional cross-sectional shape and a three-dimensional cross-sectional shape. For example, the two-dimensional cross-sectional shape is a cross-sectional shape acquired by irradiating the groove of the rim at one radius vector angle with the measurement light flux and receiving the reflected light flux. For example, in the present embodiment, the two-dimensional cross-sectional shape is a shape of a surface obtained by cutting the groove of the rim in a direction (the Z direction in the present embodiment) orthogonal to a radius vector direction (the XY direction in the present embodiment) of the eyeglass frame. For example, the two-dimensional cross-sectional shape may be acquired by scanning the measurement light flux along a transverse position (the Z direction in the present embodiment). For example, the three-dimensional cross-sectional shape is a cross-sectional shape acquired by acquiring the two-dimensional cross-sectional shape for each radius vector angle. For example, the three-dimensional cross-sectional shape may be acquired by scanning the measurement light flux for acquiring the two-dimensional cross-sectional shape in a radial plane direction (the XY plane direction in the present embodiment) of the eyeglass frame.

For example, when the cross-sectional shape is acquired, in a case where a part of the cross-sectional shape is missing, the missing part may be interpolated from the light reception result of the reflected light flux at a position (for example, adjacent position) around the position at which the part is missing. Further, for example, when the cross-sectional shape is acquired, in a case where a part of the cross-sectional shape is missing, the missing part may be interpolated by approximating the cross-sectional shape. For example, when the cross-sectional shape is acquired, in a case where a part of the cross-sectional shape is missing, the cross-sectional shape may be re-acquired such that the missing part is acquired.

For example, regarding the two-dimensional cross-sectional shape, the two-dimensional cross-sectional shape of the groove of the rim at least at one location (position of one radius vector angle) within the entire periphery (all parts where the rim is formed at each radius vector angle) of the rim of the eyeglass frame may be acquired. In this case, for example, the two-dimensional cross-sectional shape may be acquired in the entire periphery of the rim of the eyeglass frame. In this case, for example, the two-dimensional cross-sectional shape may be acquired at a plurality of positions (for example, the left end, the right end, the upper end, and the lower end of the eyeglass frame) in the entire periphery of the rim of the eyeglass frame. In addition, in this case, for example, the two-dimensional cross-sectional shape may be acquired at a position of one radius vector angle in the entire periphery of the rim of the eyeglass frame.

For example, in a case of acquiring the three-dimensional cross-sectional shape, the three-dimensional cross-sectional shape of the groove of the rim at least at a part of the region within the entire periphery (all parts where the rim is formed at each radius vector angle) of the rim of the eyeglass frame may be acquired. In this case, for example, the three-dimensional cross-sectional shape may be acquired in the entire periphery of the rim of the eyeglass frame. In this case, for example, the three-dimensional cross-sectional shape may be acquired at a plurality of regions (for example, the left end region, the right end region, the upper end region, and the lower end region of the eyeglass frame) in the entire periphery of the rim of the eyeglass frame. In in this case, for example, the three-dimensional cross-sectional shape may be acquired at a part of the region in the entire periphery of the rim of the eyeglass frame. In in a case where the three-dimensional cross-sectional shape is not acquired with respect to the entire periphery of the rim of the eyeglass frame, and in a case where the three-dimensional cross-sectional shape of the entire periphery of the rim of the eyeglass frame is to be acquired, the three-dimensional cross-sectional shape of the entire periphery of the rim of the eyeglass frame may be acquired by performing interpolation based on the two-dimensional cross-sectional shape (three-dimensional cross-sectional shape) of a part at which the two-dimensional cross-sectional shape is acquired.

For example, the controller may acquire the shape (shape data) of the rim of the eyeglass frame based on the acquired cross-sectional shape of the rim. In this case, for example, the controller may detect the bottom of the groove of the rim at each of the plurality of radius vector angles of the eyeglass frame from the cross-sectional shape of the groove of the rim at the plurality of radius vector angles of the eyeglass frame, and may acquire the shape (for example, spherical shape and peripheral length) of the rim of the eyeglass frame based on the detected detection result.

For example, the controller acquires the shape (spherical shape data) of the rim of the eyeglass frame based on the detection result detected by the second detector. For example, the shape of the rim may be a spherical shape (spherical shape data) of the rim. Further, for example, the shape of the rim may be the peripheral length (peripheral length data) of the rim computed based on the spherical shape of the rim. For example, the shape (spherical shape of the rim) of the rim measured by the probe may be a three-dimensional spherical shape (three-dimensional spherical shape data) of the rim, or may be a two-dimensional spherical shape (two-dimensional spherical shape data) of the rim. Further, for example, the spherical shape of the rim measured by the probe may be a shape based on the inner shape of the rim.

For example, in the present embodiment, the three-dimensional spherical shape of the rim is acquired by moving the probe in the groove of the rim in the peripheral direction of the eyeglass frame and performing the measurement. For example, the three-dimensional spherical shape of the rim is acquired by measuring the three-dimensional position (XYZ position) of the groove of the rim at each radius vector angle of the eyeglass frame. For example, the controller may compute the peripheral length (distance in the peripheral direction of the rim) of the rim as the rim shape based on the three-dimensional spherical shape of the rim.

For example, in the present embodiment, the two-dimensional spherical shape of the rim is acquired by moving the probe in the groove of the rim in the peripheral direction of the eyeglass frame and performing the measurement. For example, the two-dimensional spherical shape of the rim is acquired by measuring the two-dimensional position (XY position) of the groove of the rim at each radius vector angle of the eyeglass frame. For example, the controller may compute the peripheral length of the rim based on the two-dimensional spherical shape of the rim as the shape of the rim.

For example, the controller may acquire the two-dimensional spherical shape based on the three-dimensional spherical shape of the rim. In this case, for example, the two-dimensional spherical shape of the rim may be acquired by projecting the three-dimensional spherical shape of the rim onto a two-dimensional plane (XY plane).

For example, when the spherical shape (for example, two-dimensional spherical shape or three-dimensional spherical shape) is acquired, in a case where a part of the spherical shape is missing, the missing part may be interpolated from the measurement result at a position (for example, adjacent position) around the position at which the part is missing. For example, when the spherical shape is acquired, in a case where a part of the spherical shape is missing, the spherical shape may be re-acquired such that the missing part is acquired.

For example, regarding the three-dimensional spherical shape of the rim, the three-dimensional spherical shape of the rim at least at one location (position of one radius vector angle) within the entire periphery (all parts where the rim is formed at each radius vector angle) of the rim of the eyeglass frame may be acquired. In this case, for example, the three-dimensional spherical shape of the rim may be acquired in the entire periphery of the rim of the eyeglass frame. In this case, for example, the three-dimensional spherical shape of the rim may be acquired at a plurality of positions (for example, the left end, the right end, the upper end, and the lower end of the eyeglass frame) in the entire periphery of the rim of the eyeglass frame. In in this case, for example, the three-dimensional spherical shape of the rim may be acquired at a position of one radius vector angle in the entire periphery of the rim of the eyeglass frame. Even in a case of acquiring the two-dimensional spherical shape of the rim, the three-dimensional spherical shape of the rim at least at one location (the position of one radius vector angle) may be acquired similar to the acquisition of the three-dimensional spherical shape of the rim described above.

For example, the controller may acquire integrated rim shape data by associating the cross-sectional shape of the groove of the rim acquired by the optical measurement unit and the shape of the rim measured by the probe unit with each other. For example, the integrated rim shape data may be data newly acquired by integrating (combining) the cross-sectional shape of the groove of the rim acquired by the optical measurement unit and the shape of the rim measured by the probe unit. As an example, for example, the integrated rim shape data may be data in which the cross-sectional shape of the rim and the peripheral length of the rim are combined with each other.

For example, regarding the peripheral length of the rim, compared to the peripheral length of the rim measured by the optical measurement unit, the peripheral length of the rim measured in a contact manner by the probe can acquire more accurate result. Further, for example, the same can be employed for the spherical shape as the peripheral length of the rim. On the other hand, although it is difficult to measure the cross-sectional shape of the rim in the measurement by the probe unit, the cross-sectional shape can be easily acquired by the optical measurement unit. Therefore, it is possible to acquire more excellent data by combining the shape of the rim acquired by the probe unit and the cross-sectional shape of the groove of the rim measured by the optical measurement unit with each other. In other words, it is possible to acquire the data while satisfying the missing parts of each of the optical measurement unit and the probe unit, which leads to more excellent processing.

In the present embodiment, in a case where the imaging optical axis of the light receiving optical system is inclined downward by the inclination angle α in the Z direction with respect to the optical axis of the light projecting optical system, the cross-sectional shape of the groove of the rim may be corrected. Further, in the present embodiment, in a case where the imaging optical axis of the light receiving optical system is disposed to be inclined by the inclination angle θ on the XY plane with respect to the optical axis of the light projecting optical system, the cross-sectional shape of the groove of the rim may be corrected. Further, for example, in the present embodiment, in a case where the optical axis of the light projecting optical system in the optical measurement unit is disposed to be inclined by the inclination angle β on the radial plane (XY plane) with respect to the measuring axis extending from the probe to the measurement position of the groove of the rim of the eyeglass frame, the cross-sectional shape of the groove of the rim may be corrected. In other words, in a case of having any one of the inclination configurations as described above, for example, the controller may correct the cross-sectional shape of the groove of the rim based on at least one of the inclination angle α, the inclination angle β, and the inclination angle θ. As an example, the controller may correct the cross-sectional shape of the groove of the rim of the eyeglass frame by a trigonometric function using at least one of the inclination angle α, the inclination angle β, and the inclination angle θ. It is needless to say that the controller may correct the cross-sectional shape of the groove of the rim of the eyeglass frame by calculation different from the trigonometric function based on at least one of the inclination angle α, the inclination angle β, and the inclination angle θ. In this manner, by correcting the cross-sectional shape of the groove of the rim based on the inclination angle, it becomes possible to acquire the cross-sectional shape in which the distortion of the cross-sectional shape caused by the influence of the inclination angle is corrected, and the cross-sectional shape of the groove of the rim can be accurately acquired.

Movement Portion

For example, the movement portion can move the probe in any direction with respect to the holding unit. For example, the movement portion may be capable of moving the probe at least in any of the X direction, the Y direction, the Z direction, the rotation direction (rotation), and the inclination direction (inclination) with respect to the holding unit. For example, the configuration in which the probe is movable in the rotation direction with respect to the holding unit indicates a configuration in which the probe is rotatable around a predetermined rotation axis (for example, rotation axis LO). Further, for example, the configuration in which the probe is movable in the inclination direction with respect to the holding unit indicates a configuration in which the probe can be inclined with respect to the holding unit.

For example, the movement portion can move the optical measurement unit in any direction with respect to the holding unit. For example, the movement portion may be capable of moving the optical measurement unit at least in any of the X direction, the Y direction, the Z direction, the rotation direction (rotation), and the inclination direction (inclination) with respect to the holding unit. For example, the configuration in which the optical measurement unit is movable in the rotation direction with respect to the holding unit indicates a configuration in which the optical measurement unit is rotatable around a predetermined rotation axis (for example, rotation axis LO). Further, for example, the configuration in which the optical measurement unit is movable in the inclination direction with respect to the holding unit indicates a configuration in which the optical measurement unit is can be inclined with respect to the holding unit.

For example, both the movement portion for making the probe movable with respect to the holding unit and the movement portion for making the optical measurement unit movable with respect to the holding unit may be used. In this case, for example, as the optical measurement unit is connected to the probe and the probe is moved with respect to the holding unit, the optical measurement unit may be configured to be integrally moved together with the probe with respect to the holding unit. In other words, as the movement portion can move the probe with respect to the holding unit, the optical measurement unit may be configured to be integrally moved together with the probe with respect to the holding unit.

Lens Processing

For example, the cross-sectional shape of the groove of the rim of the eyeglass frame and the shape of the rim of the eyeglass frame, which are acquired by the eyeglass frame shape measurement device, may be used for processing the lens. It is needless to say that the integrated rim shape data acquired based on the cross-sectional shape and the rim shape may be used. For example, a lens processing device (for example, lens processing device 300) that processes the peripheral edge of a lens acquires the cross-sectional shape of the groove of the rim of the eyeglass frame acquired by the optical measurement unit in the eyeglass frame shape measurement device and the shape of the rim acquired by the probe unit in the eyeglass frame shape measurement device.

For example, the eyeglass frame shape measurement device may include a transmitting means, and transmit the cross-sectional shape of the groove of the rim and the shape of the rim of the eyeglass frame toward the lens processing device by the transmitting means. In this case, for example, the lens processing device may have a receiving means and receive the cross-sectional shape of the groove of the rim and the shape of the rim of the eyeglass frame transmitted from the eyeglass frame shape measurement device.

For example, a configuration in which the eyeglass frame shape measurement device is provided in the lens processing device may be employed. In addition, for example, the lens processing device and the eyeglass frame shape measurement device may be devices separated from each other. In this case, the cross-sectional shape of the groove of the rim and the shape of the rim of the eyeglass frame may be transmitted from the eyeglass frame shape measurement device to the lens processing device at least in one of the wired and wireless manner.

For example, the lens processing device may include a processing controller (for example, controller 310). For example, the processing controller may process the peripheral edge of the lens based on the cross-sectional shape of the groove of the rim and the shape of the rim of the eyeglass frame acquired by the eyeglass frame shape measurement device. For example, the processing controller may control a lens holding means and a processing tool for holding the lens and process the peripheral edge of the lens based on the cross-sectional shape of the groove of the rim and the shape of the rim of the eyeglass frame.

For example, in the present embodiment, the lens processing device includes a processing controller for processing the peripheral edge of the lens based on the cross-sectional shape of the groove of the rim and the shape of the rim of the eyeglass frame. Accordingly, when the processed lens is excellently framed into the eyeglass frame, the shape of the groove of the rim and the contour shape of the processed lens are close to each other, and thus, the framing can be excellently performed.

EXAMPLE

Figure 2:
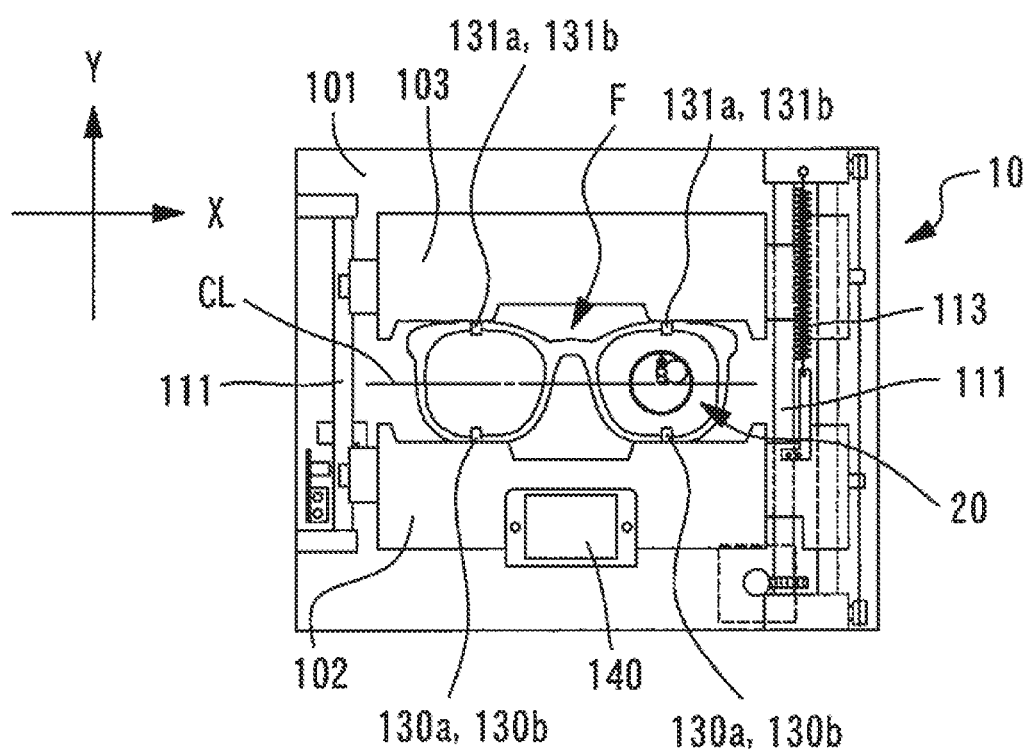
FIG. 2 is a top view of a frame holding unit in a state where an eyeglass frame is held.

One typical example of the present disclosure will be described with reference to the drawings. FIG. 1 is a schematic external view of the eyeglass frame shape measurement device. For example, FIG. 2 is a top view of a frame holding unit in a state where the eyeglass frame is held. For example, in the present example, the eyeglass frame shape measurement device 1 includes a frame holding unit 10 and a measurement unit 20. For example, the frame holding unit 10 holds the eyeglass frame F in a desired state. For example, by emitting the measurement light flux toward the groove of the rim (for example, left rim FL, right rim FR) of the eyeglass frame F held by the frame holding unit 10, and receiving the reflected light flux, the measurement unit 20 is used for acquiring the cross-sectional shape of the groove of the rim of the eyeglass frame F. In addition, for example, by inserting the probe into the groove of the rim (for example, the left rim FL, the right rim FR) of the eyeglass frame F held by the frame holding unit 10, and detecting the movement of the probe, the measurement unit 20 measures the shape of the rim. For example, the measurement unit 20 is disposed under the frame holding unit 10.

For example, the switch unit 4 having a measurement start switch and the like is disposed on the front side of the housing of the eyeglass frame shape measurement device 1. For example, a touch panel type display 3 is disposed on the rear side of the housing of the eyeglass frame shape measurement device 1. For example, when processing the peripheral edge of the lens, lens layout data for the spherical shape data, lens processing conditions, and the like are input through the touch panel type display 3. For example, the acquisition results (cross-sectional shape of the groove of the rim, eyeglass frame shape, and the like) obtained by the eyeglass frame shape measurement device 1 and the data input on the display 3 are transmitted to the lens processing device. The eyeglass frame shape measurement device 1 may be configured to be incorporated in a lens processing device, as in JP-A-2000-314617.

Frame Holding Unit

For example, the measurement unit 20 is provided below the frame holding unit 10. For example, a front slider 102 and a rear slider 103 for holding the eyeglass frame F horizontally are placed on a holding unit base 101. For example, the horizontal may mean substantially horizontal. For example, the front slider 102 and the rear slider 103 are slidably disposed facing each other on two rails 111 with a center line CL as a center, and are always pulled in the direction toward the center line CL of both sliders by a spring 113.

For example, in the front slider 102, clamp pins 130*a* and 130*b* for clamping the rim of the eyeglass frame F from the thickness direction are respectively disposed at two locations. For example, in the rear slider 103, clamp pins 131*a* and 131*b* for clamping the rim of the eyeglass frame F from the thickness direction are respectively disposed at two locations. For example, when measuring a template, the front slider 102 and the rear slider 103 are opened, and a known template holding jig is disposed at a predetermined attaching position 140 and used. As the configuration of the frame holding unit 10, for example, a known configuration described in JP-A-2000-314617 can be used.

For example, in the eyeglass frame F, the lower side of the rim when wearing the eyeglasses is positioned on the front slider 102 side, and the upper side of the rim is positioned on the rear slider 103 side. For example, the eyeglass frame F is held in a predetermined measurement state by clamp pins positioned on each of the lower side and the upper side of the left and right rims.

In the present example, as a configuration for regulating the position of the rim in the front-rear direction, a configuration of the clamp pins 130*a* and 130*b* and the clamp pins 131*a* and 131*b* has been described as an example, but the configuration is not limited thereto. A known mechanism may be used. For example, as a mechanism for fixing the front-rear direction of the left and right rims, a configuration in which contact members (regulating members) having a V-shaped groove are respectively provided for the left and right rims may be employed.

Measurement Unit

Hereinafter, a configuration of the measurement unit 20 will be described. For example, the measurement unit 20 includes the optical measurement unit 30. For example, the optical measurement unit 30 includes the light projecting optical system 30*a* and the light receiving optical system 30*b*. For example, the light projecting optical system 30*a* and the light receiving optical system 30*b* are used for acquiring the shape of the eyeglass frame and the cross-sectional shape of the groove of the rim of the eyeglass frame (details will be described later). Further, for example, the measurement unit 20 includes the probe unit 60. For example, the probe unit includes the probe 61. For example, the probe unit 60 is used to acquire the shape (for example, the spherical shape of the rim) of the rim of the eyeglass frame (details will be described later). In the present example, the optical measurement unit 30 is connected to the probe 61 in the probe unit 60.

For example, the measurement unit 20 includes the holding unit 25 that holds the optical measurement unit 30 (the light projecting optical system 30*a* and the light receiving optical system 30*b*) and the probe unit 60. For example, the measurement unit 20 includes the movement unit 210 that moves the holding unit 25 in the XYZ directions (refer to, for example, FIGS. 3 to 5). For example, the measurement unit 20 includes the rotation unit 260 that rotates the holding unit 25 around the rotation axis L0 (refer to, for example, FIG. 6). For example, in the present example, the XY direction is a direction parallel to the measurement plane (the radius vector direction of the rim) of the eyeglass frame F held by the frame holding unit 10, and the Z direction is a direction orthogonal to the measurement plane.

Movement Unit

Figure 3:
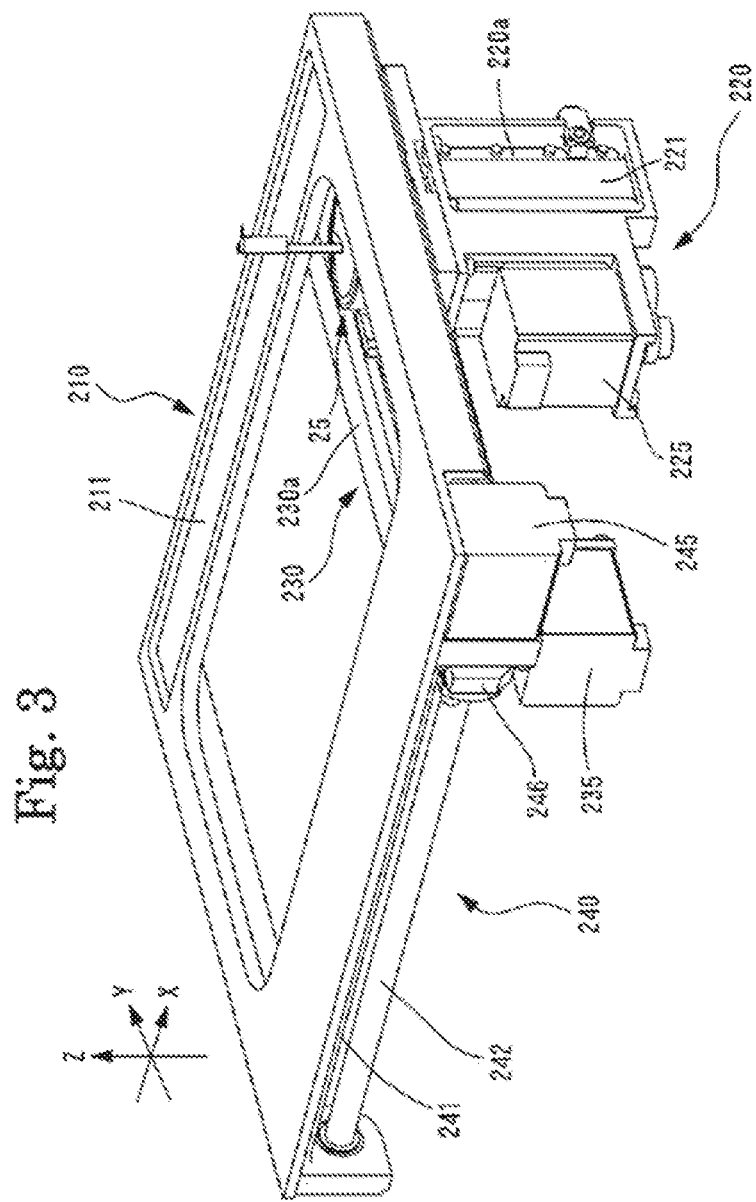
FIG. 3 illustrates a perspective view of a movement unit when viewed from above.
Figure 4:
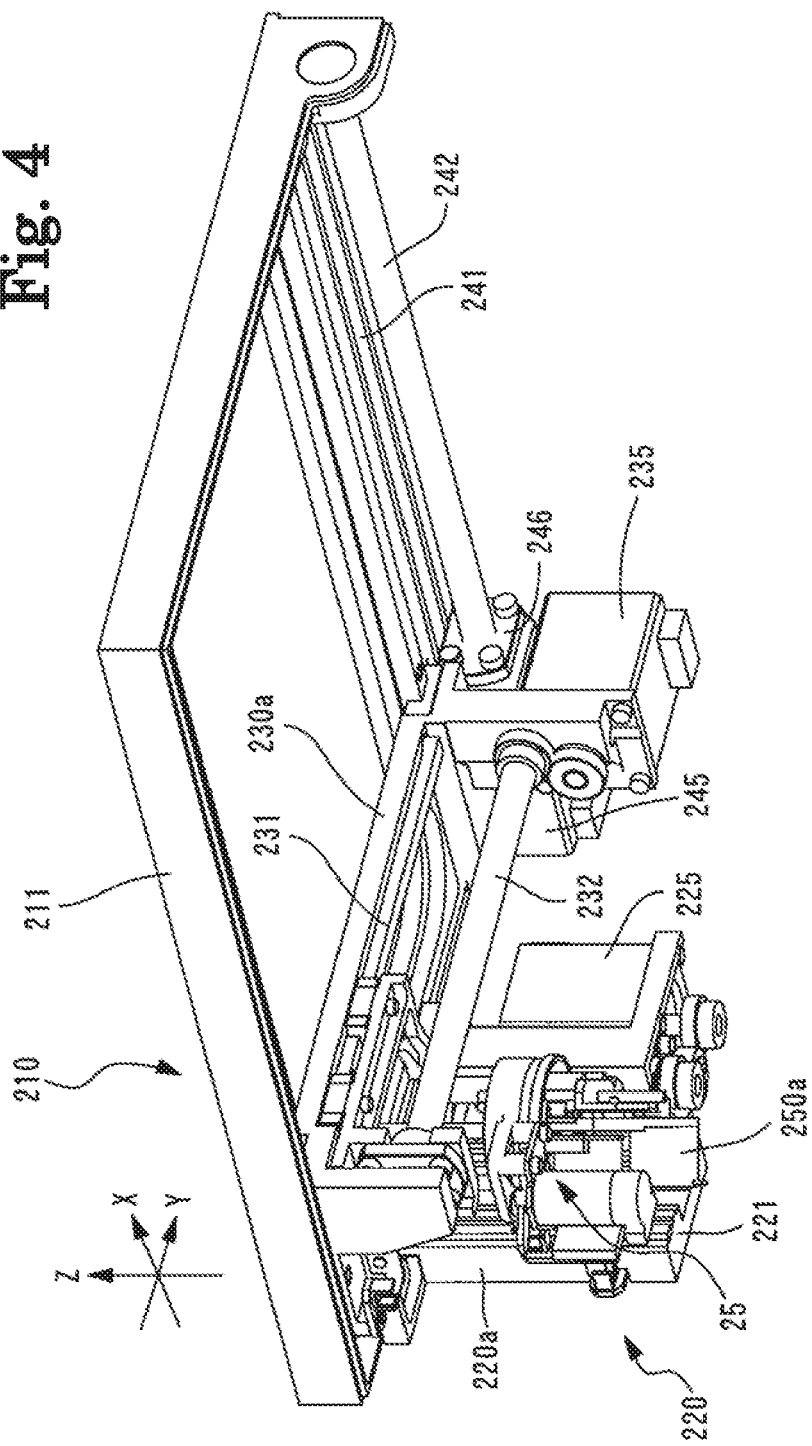
FIG. 4 illustrates a perspective view of the movement unit when viewed from below.
Figure 5:
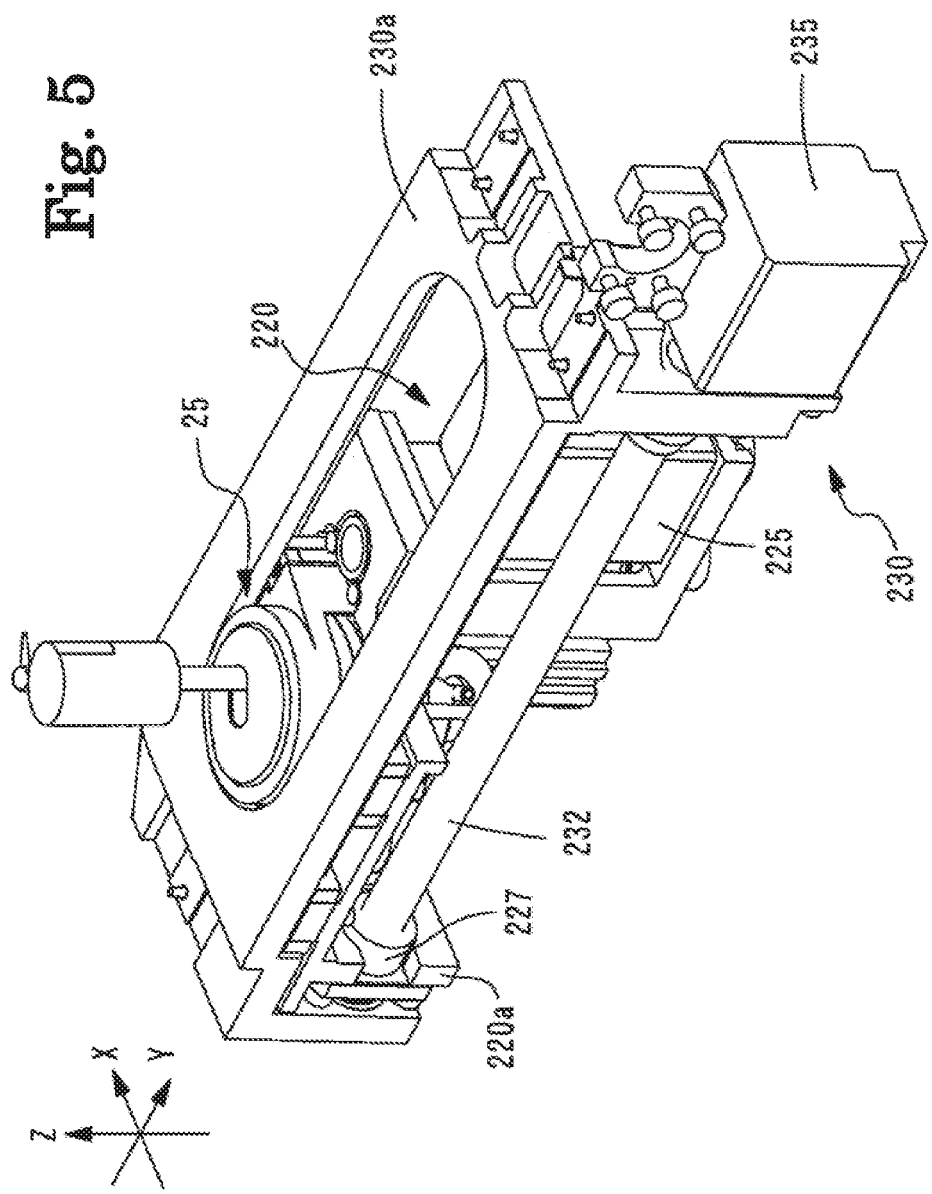
FIG. 5 is a top perspective view of a Z movement unit and a Y movement unit.

Hereinafter, the movement unit 210 will be described. For example, FIGS. 3 to 5 are views for describing the configuration of the movement unit 210. For example, FIG. 3 illustrates a perspective view of the movement unit 210 when viewed from above. For example, FIG. 4 illustrates a perspective view of the movement unit 210 when viewed from below. For example, FIG. 5 illustrates a top perspective view of a Z movement unit 220 and a Y movement unit 230 (a perspective view in a state where an X movement unit 240 and a base unit 211 are removed).

For example, the movement unit 210 roughly includes the Z movement unit (Z-direction changing portion) 220, the Y movement unit (Y-direction changing portion) 230, and the X movement unit (X-direction changing portion) 240. For example, the Z movement unit (Z-direction changing portion) 220 moves the holding unit 25 in the Z direction. For example, the Y movement unit 230 holds and moves the holding unit 25 and the Z movement unit 220 in the Y direction. For example, the X movement unit 240 moves the holding unit 25 in the X direction together with the Z movement unit 220 and the Y movement unit 230.

For example, the X movement unit 240 is schematically configured as follows. For example, the X movement unit 240 includes a guide rail 241 that extends in the X direction below the base unit 211 having a rectangular frame that stretches in the horizontal direction (XY direction). For example, a Y base 230*a* of the Y movement unit 230 is attached along the guide rail 241 so as to be movable in the X direction. For example, a motor (actuator) 245 is attached to the base unit 211. For example, a feed screw 242 that extends in the X direction is attached to the rotation axis of the motor 245. For example, a nut unit 246 fixed to the Y base 230*a* is screwed to the feed screw 242. Accordingly, when the motor 245 is rotated, the Y base 230*a* is moved in the X direction. For example, the movement range in the X direction of the X movement unit 240 may have a length by which the Y base 230*a* with the holding unit 25 mounted thereon can be moved more than the horizontal width of the eyeglass frame in order to make the left and right lens frames of the eyeglass frame measurable.

For example, the Y movement unit 230 is schematically configured as follows. For example, a guide rail 231 that extends in the Y direction is attached to the Y base 230a. For example, a Z base 220a is attached along the guide rail 231 so as to be movable in the Y direction. For example, a Y movement motor (actuator) 235 and a feed screw 232 that extends in the Y direction are rotatably attached to the Y base 230a. For example, the rotation of the motor 235 is transmitted to the feed screw 232 via a rotation transmission mechanism, such as a gear. For example, a nut 227 attached to the Z base 220a is screwed to the feed screw 232. With these configurations, when the motor 235 is rotated, the Z base 220a is moved in the Y direction.

For example, the X movement unit 240 and the Y movement unit 230 configure an XY movement unit. For example, the range in which the holding unit 25 is moved in the XY directions is larger than the measurable rim radius vector. For example, the movement position of the holding unit 25 in the XY direction is detected by the number of pulses by which the motor 245 and the motor 235 are driven by the controller 50 which will be described later, and a first XY position detection unit that detects the position of the holding unit 25 in the XY direction is configured with the motors 245 and 235 and the controller 50. For example, the XY position detection unit of the holding unit 25 may be configured to use sensors, such as encoders attached to each of the rotation axes of the motor 245 and the motor 235 in addition to detection by pulse control of the motor 245 and the motor 235.

For example, the Z movement unit 220 is schematically configured as follows. For example, a guide rail 221 that extends in the Z direction is formed on the Z base 220a, and a moving base 250a to which the holding unit 25 is attached is held along the guide rail 221 so as to be movable in the Z direction. For example, a pulse motor 225 for the Z movement is attached to the Z base 220a, and a feed screw (not illustrated) that extends in the Z direction is rotatably attached. For example, the pulse motor 225 is screwed into a nut attached to the moving base 250a of the holding unit 25. For example, the rotation of the motor 225 is transmitted to a feed screw via a rotation transmission mechanism, such as a gear, and the holding unit 25 is moved in the Z direction by the rotation of the feed screw. The movement position of the holding unit 25 in the Z direction is detected by the number of pulses by which the motor 225 is driven by the controller 50 which will be described later, and a Z position detection unit that detects the position of the holding unit 25 in the Z direction is configured with the motor 225 and the controller 50. For example, the Z position detection unit of the holding unit 25 may be configured to use sensors, such as encoders attached to the rotation axis of the motor 225 in addition to detection by pulse control of the motor 225.

Each movement mechanism in the X direction, the Y direction, and the Z direction as described above is not limited to the example, and a known mechanism can be adopted. For example, instead of moving the holding unit 25 in a straight line, a configuration in which the holding unit 25 is moved by starting an arc with respect to the center of the rotation base may be employed (refer to, for example, JP-A-2006-350264).

Optical Measurement Unit, Probe Unit, and Rotation Unit

Figure 6:
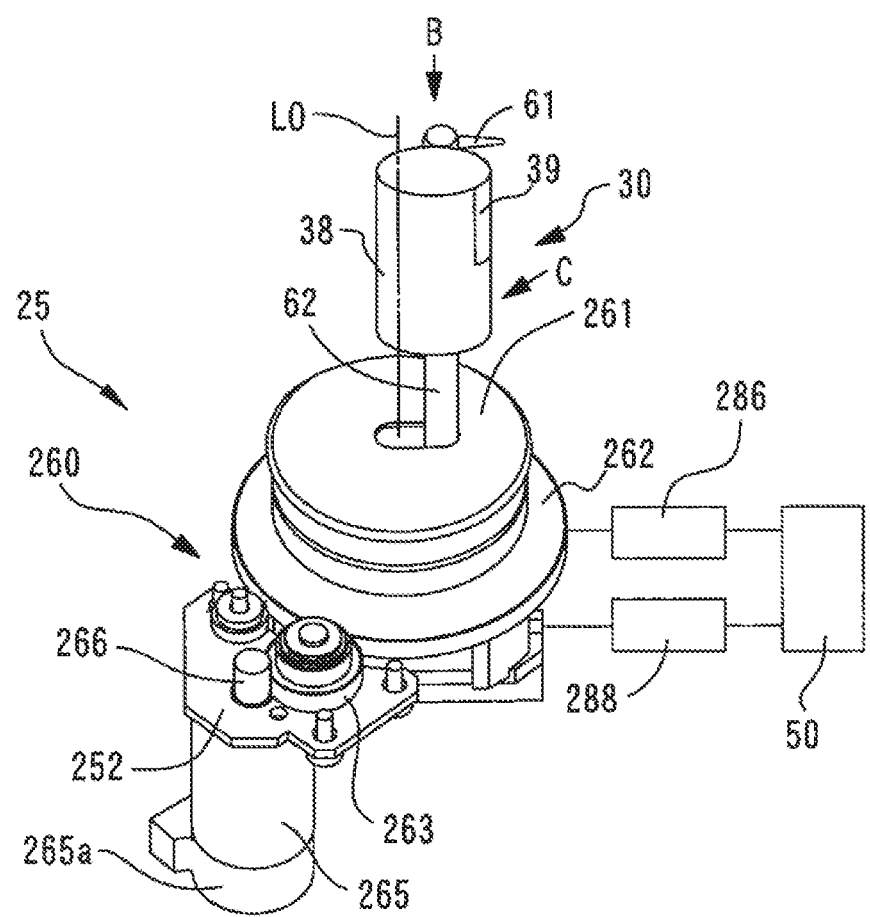
FIG. 6 is a view describing an optical measurement unit, a rotation unit, and a probe unit.

Next, the optical measurement unit 30, the rotation unit 260, and the probe unit 60 will be described. For example, FIG. 6 is a view describing the optical measurement unit 30, the rotation unit 260, and the probe unit 60.

For example, the probe unit 60 includes the probe 61 and the probe shaft 62. For example, the probe 61 is attached to the probe shaft 62. For example, the holding unit 25 has the rotation unit 260 that rotates the probe shaft 62 around the rotation axis LO that extends in the Z direction. For example, the rotation unit 260 has a rotation base 261 to which the probe shaft 62 is attached, and a motor (actuator) 265 that rotates the rotation base 261 around the rotation axis LO.

For example, the rotation base 261 holds the probe shaft 62 so as to be movable (inclinable) in the tip direction of the probe 61. In other words, the probe shaft 62 is held by the holding unit 25 so as to be movable (inclinable) in the tip direction of the probe 61. Further, for example, the rotation base 261 holds the probe shaft 62 so as to be movable in the Z direction. In other words, the probe shaft 62 is held by the holding unit 25 so as to be movable in the Z direction. For example, the position of the probe 61 in the tip direction and the center position of the probe shaft 62 are detected by the encoder 286 which is a detector. The position of the probe 61 in the Z direction and the position of the probe shaft 62 in the Z direction are detected by the encoder 288 which is a detector. The holding unit 25 includes a measurement pressure applying mechanism (not illustrated) for applying a measurement pressure for pressing the tip of the probe 61 against the groove of the rim (the right rim FR and the left rim FL). As the configuration of the probe unit 60, for example, a known configuration described in JP-A-2013-68488 can be used.

For example, the optical measurement unit 30 is connected to the probe shaft 62 of the probe unit 60. For example, when the probe shaft 62 is moved, the optical measurement unit 30 connected to the probe shaft 62 is integrally moved according to the movement of the probe shaft 62. For example, the optical measurement unit 30 is movable (inclinable) in the tip direction of the probe 61 in accordance with the movement of the probe shaft 62, and is also movable in the Z direction. In other words, the optical measurement unit 30 is held by the holding unit 25 so as to be movable (inclinable) in the tip direction of the probe 61, and is also held so as to be movable in the Z direction. In this case, for example, the position of the optical measurement unit 30 is detected by the encoder 286 and the encoder 288, which are detectors, similarly to the detection of the positions of the probe 61 and the probe shaft 62. Further, by rotating the probe shaft 62 around the rotation axis LO, the optical measurement unit 30 is rotated around the rotation axis LO.

For example, the optical measurement unit 30 has a cover 38. For example, the light projecting optical system 30a and the light receiving optical system 30b are accommodated inside the cover 38. For example, the cover 38 is provided with an opening unit 39. For example, the opening unit 39 allows the measurement light flux from the light projecting optical system 30a to pass and allows the reflected light flux reflected by the eyeglass frame F to pass. For example, the opening unit 39 may be provided with a transparent panel that covers the opening unit 39. For example, the opening unit 39 emits the measurement light flux emitted from the light projecting optical system 30a from the inside of the cover 38 to the outside. In other words, the measurement light flux from the light projecting optical system 30a passes through the opening unit 39 and is emitted toward the groove of the rim of the eyeglass frame F. For example, the opening unit 39 allows the reflected light flux reflected by the groove of the rim of the eyeglass frame F to pass from the outside of the cover 38 toward the light receiving optical system 30b inside the cover 38. In other words, the reflected light flux reflected by the groove of the rim of the eyeglass frame F passes through the opening unit 39 and is received by the light receiving optical system 30b. For example, the rotation unit 260 changes the XY direction in which the opening unit 39 faces by rotating the probe shaft 62 around the rotation axis LO that extends in the Z direction.

For example, a large-diameter gear 262 is formed at the outer periphery of the lower unit of the rotation base 261. For example, the rotation unit 260 has an attachment plate 252. For example, the motor 265 is attached to the attachment plate 252. For example, a pinion gear 266 is fixed to the rotation axis of the motor 265, and the rotation of the pinion gear 266 is transmitted to the large-diameter gear 262 via a gear 263 that is rotatably provided on the attachment plate 252. Therefore, the rotation base 261 is rotated around the rotation axis LO by the rotation of the motor 265. For example, the rotation of the motor 265 is detected by an encoder (sensor) 265a integrally attached to the motor 265, and the rotation angle of the rotation base 261 (that is, the probe shaft 62 and the optical measurement unit 30) is detected from the output of the encoder 265a. The origin position of the rotation of the rotation base 261 is detected by an origin position sensor (not illustrated). Each movement mechanism of the above rotation units 260 is not limited to the example, and a known mechanism can be employed.

Figure 7:
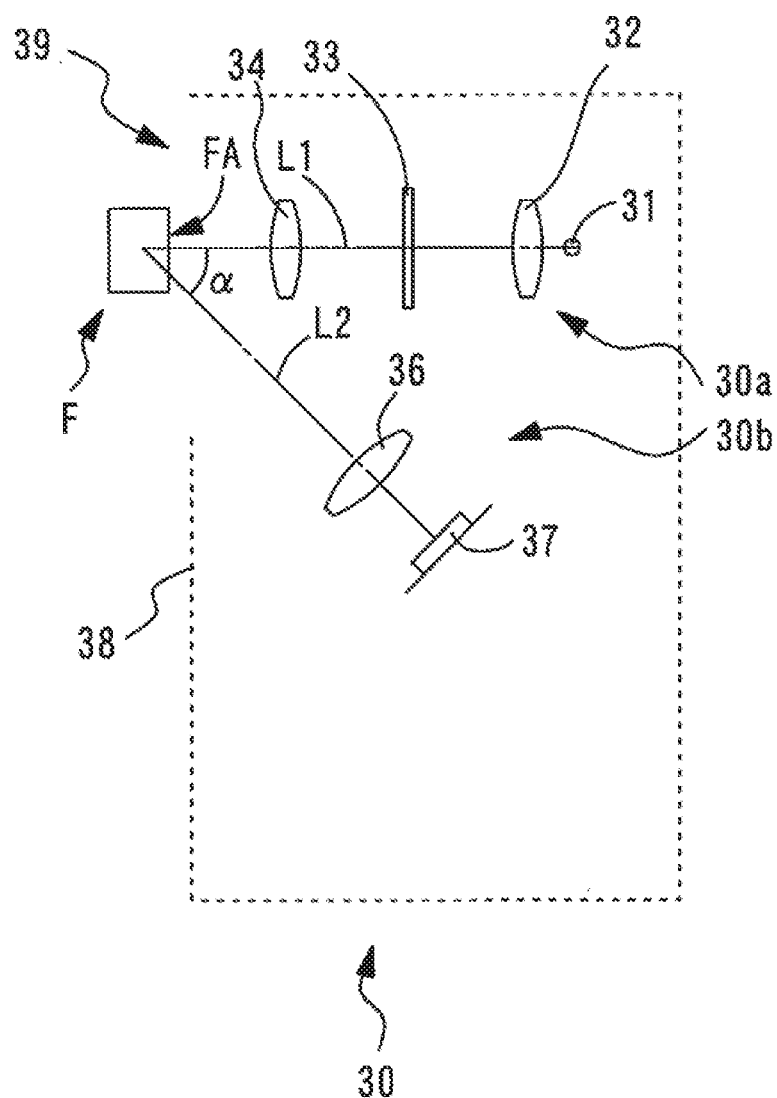
FIG. 7 is a schematic configuration view illustrating an optical system of the optical measurement unit.

Next, the details of the optical measurement unit 30 will be described. For example, FIG. 7 is a schematic configuration view illustrating an optical system of the optical measurement unit 30. For example, FIG. 7 illustrates a view of the optical measurement unit 30 when viewed from the side (direction C in FIG. 6). For example, the optical measurement unit 30 is used for acquiring the eyeglass frame F. For example, in the present example, the optical measurement unit 30 is used for acquiring the cross-sectional shape of the groove of the rim of the eyeglass frame F. In addition, for example, in the present example, the optical measurement unit 30 is used for measuring the shape of the eyeglass frame F. For example, the optical measurement unit 30 includes the light projecting optical system 30a and the light receiving optical system 30b. For example, the light projecting optical system 30a and the light receiving optical system 30b are disposed inside the cover 38.

For example, in the present example, the optical measurement unit 30 is configured to acquire the cross-sectional shape of the groove of the rim of the eyeglass frame F based on the Scheimpflug principle. For example, the light projecting optical system 30a irradiates the groove of the rim of the eyeglass frame with slit light. For example, the light receiving optical system 30b has the imaging optical axis L2 inclined with respect to the optical axis L1 irradiated with the slit light, and includes a lens and a detector that are disposed based on the Scheimpflug principle. It is needless to say that the optical measurement unit 30 may be an optical system having a different configuration instead of the optical system based on the Scheimpflug principle. The optical measurement unit 30 may be an optical system that acquires the cross-sectional shape of the groove of the rim of the eyeglass frame F.

For example, the light projecting optical system 30a includes the light source 31, a lens 32, a slit plate 33, and a lens 34. For example, the measurement light flux emitted from the light source 31 is condensed by the lens 32 and illuminates the slit plate 33. For example, the measurement light flux that illuminates the slit plate 33 becomes the measurement light flux limited to a narrow slit-shape by the slit plate 33 and irradiates a groove FA of the rim of the eyeglass frame F via the lens 34. In other words, for example, the groove FA of the rim of the eyeglass frame F is irradiated with the slit light. Accordingly, the groove FA of the rim of the eyeglass frame F is illuminated in the form of being light-cut by the slit light.

For example, the light receiving optical system 30b includes a lens 36 and a detector (for example, light receiving element) 37. For example, the light receiving optical system 30b is disposed below the light projecting optical system 30a in the Z direction. In other words, for example, in the light receiving optical system 30b, the optical axis (imaging optical axis) L2 of the light receiving optical system 30b is disposed to be inclined downward by the inclination angle α in the Z direction with respect to the optical axis L1 of the light projecting optical system 30a. For example, the light receiving optical system 30b detects from below the reflected light flux of the groove FA of the rim acquired by reflection at the groove FA of the rim. For example, the light receiving optical system 30b is configured to acquire the cross-sectional shape from an oblique direction with respect to the groove FA of the rim of the eyeglass frame F. For example, the light receiving optical system 30b is configured to acquire the cross-sectional shape of the groove FA of the rim of the eyeglass frame F based on the Scheimpflug principle.

For example, the lens 36 leads the reflected light flux (for example, scattered light from the groove FA of the rim, regular reflected light from the groove FA of the rim, and the like) from the groove FA of the rim acquired by the reflection at the groove FA of the rim to the detector 37. For example, the detector 37 has a light receiving surface disposed at a position substantially conjugating with the groove FA of the rim of the eyeglass frame F. For example, the light receiving optical system 30b has the imaging optical axis L2 that is inclined downward with respect to the light projecting optical axis L1 of the light projecting optical system 30a, and has the lens 36 and the detector 37 that are disposed based on the Scheimpflug principle. The light receiving optical system 30b is disposed such that the imaging optical axis L2 intersects with the optical axis L1 of the light projecting optical system 30a at a predetermined angle. For example, a light cut surface on the groove FA of the rim of the eyeglass frame F irradiated by the light projecting optical system 30a, and a light receiving surface (light receiving position) of a lens system (the groove FA of the rim of the eyeglass frame F and the lens 36) including the groove FA of the rim of the eyeglass frame F and the detector 37 are disposed in the Scheimpflug relationship.

In the present example, a configuration in which the light projecting optical system 30a and the light receiving optical system 30b are integrally disposed on one side of the probe shaft 62 has been described as an example, but the present invention is not limited thereto. For example, the light projecting optical system 30a and the light receiving optical system 30b can be disposed at any position. As an example, for example, the light projecting optical system 30a and the light receiving optical system 30b may be separately disposed on both sides of the probe shaft 62 with the probe shaft 62 interposed therebetween. With such a configuration, the light projecting optical system 30a and the light receiving optical system 30b can be disposed by using both spaces of the probe shaft 62, and thus a waste space is less likely to occur.

Figure 8:
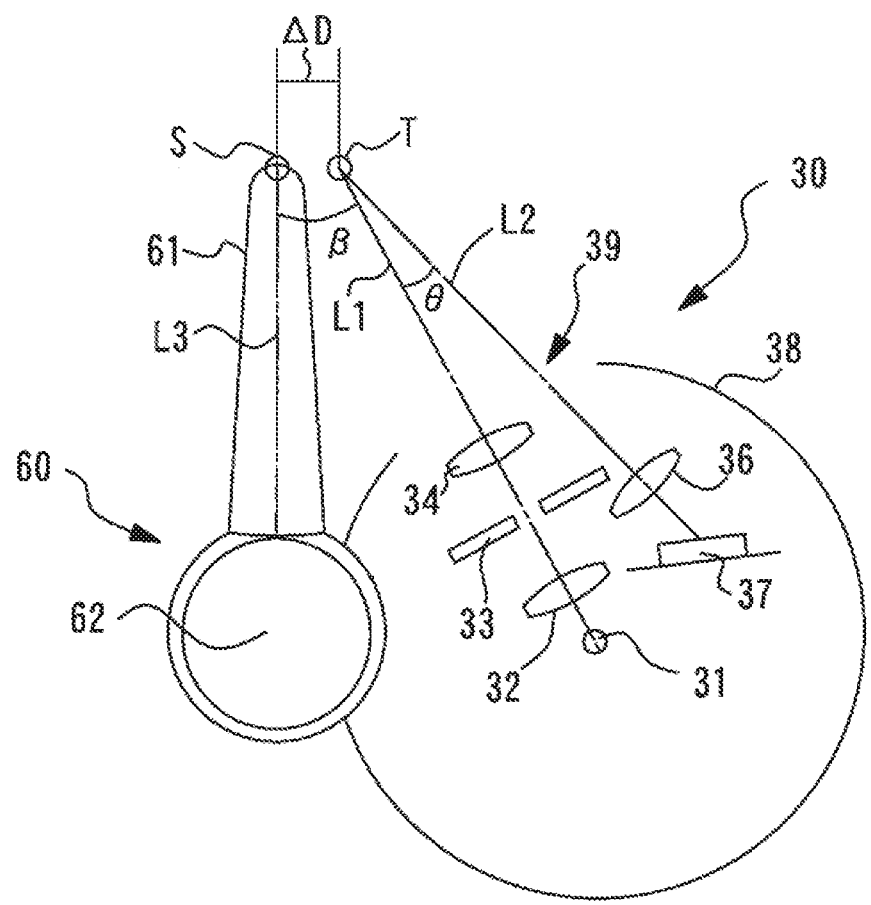
FIG. 8 illustrates a view of the optical measurement unit and the probe unit when viewed from above.

Measurement Position Relationship Between Optical Measurement Unit and Probe Unit Next, the relationship between the measurement position of the optical measurement unit 30 and the measurement position of the probe unit 60 will be described. FIG. 8 is a view of the optical measurement unit 30 and the probe unit 60 when viewed from above (direction B in FIG. 6).

For example, as illustrated in FIG. 8, in the present example, the optical measurement unit 30 and the probe unit 60 are disposed so as to measure a first measurement position T measured by the optical measurement unit 30 and a second measurement position S measured by the probe unit 60 as different measurement positions. Further, in the present example, the probe unit and the optical measurement unit are disposed so as to measure the first measurement position T and the second measurement position S as adjacent measurement positions. In the present example, the first measurement position T and the second measurement position S are displaced from each other by the displacement amount ΔD.

For example, in the present example, in order to make it possible to measure the first measurement position T and the second measurement position S as closer positions, the optical axis L1 of the light projecting optical system 30a in the optical measurement unit 30 is disposed to be inclined by the inclination angle β on the radial plane (on the XY plane) with respect to the measuring axis L3 extending from the probe 61 toward the measurement position of the groove of the rim of the eyeglass frame.

In addition, for example, in the present example, the imaging optical axis L2 of the light receiving optical system 30b in the optical measurement unit 30 is disposed to be inclined by the inclination angle θ on the radial plane (on the XY plane) with respect to the optical axis L1 of the light projecting optical system 30a such that the cut surface that is optically cut by the slit light of the light projecting optical system 30a can be detected. In other words, in the present example, the imaging optical axis L2 of the light receiving optical system 30b is disposed to be inclined downward by the inclination angle α in the Z direction and inclined by the inclination angle θ on the XY plane with respect to the optical axis L1 of the light projecting optical system 30a.

Further, for example, the first measurement position T of the optical measurement unit 30 is a measurement position preceding the second measurement position S by the probe unit 60 in the measurement proceeding direction E (refer to FIG. 10 described later). In other words, in the present example, after the measurement by the optical measurement unit 30, the measurement by the probe unit 60 is performed.

Controller

Figure 9:
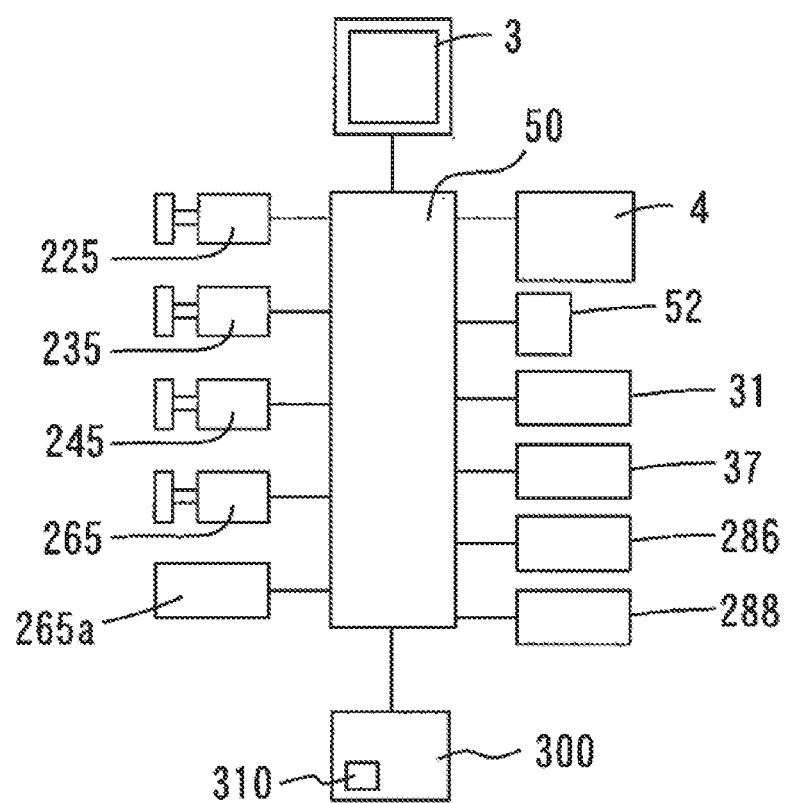
FIG. 9 is a control block diagram related to the eyeglass frame shape measurement device.

FIG. 9 is a control block diagram related to the eyeglass frame shape measurement device 1. The controller 50 is connected to a non-volatile memory (storage means) 52, the display 3, the switch unit 4, and the like.

For example, the controller 50 includes a CPU (processor), a RAM, a ROM, and the like. The CPU of the controller 50 controls the entire device, such as each unit (for example, the light source 31, the detector 37, the encoder 265a, the encoder 286, and the encoder 288) and a driving means (for example, the actuator of the frame holding unit 10 and each of the motors 225, 235, 245, and 265) of each unit. Further, for example, the controller 50 functions as a calculating means (analysis means) for performing various calculations (for example, calculation of the shape of the eyeglass frame based on output signals from each sensor). The RAM temporarily stores various pieces of information. Various programs for controlling the operation of the entire device, initial values, and the like are stored in the ROM of the controller 50. The controller 50 may be configured with a plurality of controllers (that is, a plurality of processors). The non-volatile memory (storage means) 52 is a non-transitory storage medium that can hold stored contents even when power supply is interrupted. For example, a hard disk drive, a flash ROM, a USB memory or the like that is detachably attached to the eyeglass frame shape measurement device 1 can be used as the non-volatile memory (memory) 52.

For example, the controller 50 is connected to the lens processing device 300 that processes the peripheral edge of the lens. For example, various pieces of data acquired by the eyeglass frame shape measurement device 1 are transmitted to the controller 310 of the lens processing device 300. The controller 310 of the lens processing device 300 performs lens processing by controlling each unit of the lens processing device 300 and the driving means of each unit based on the various pieces of received data. It is needless to say that the lens processing device 300 and the eyeglass frame shape measurement device 1 may be an integrally configured device.

For example, in the present example, the display 3 is a touch panel type display. In other words, in the present example, since the display 3 is a touch panel, the display 3 functions as an operation unit. In this case, the controller 50 receives an input signal by a touch panel function of the display 3 and controls display or the like of figures and information on the display 3. It is needless to say that the eyeglass frame shape measurement device 1 may be configured to be provided with the operation unit separately. In this case, for example, at least one of a mouse, a joystick, a keyboard, a touch panel, and the like may be used as the operation unit. It is needless to say that both the display 60 and the operation unit may be used and the eyeglass frame shape measurement device 1 may be operated. In the present example, a configuration in which the display 60 functions as an operation unit and the switch unit (operation unit) 4 is separately provided will be described as an example.

Control Operation

The operation of the device having the configuration above will be described. For example, the operation unit causes the frame holding unit 10 to hold the eyeglass frame F. For example, the operation unit causes the frame holding unit 10 to hold the eyeglass frame F such that the left and right rims FL and FR of the eyeglass frame F are downward and the left and right temples FTL and FTR of the eyeglass frame F are upward.

For example, when the eyeglass frame F is held by the frame holding unit 10, the operation unit operates the switch unit 4 to start the measurement. For example, when a trigger signal for starting the measurement is output, the controller 50 drives at least one of the X movement unit 240, the Y movement unit 230, the Z movement unit 220, and the rotation unit 260 to move the holding unit 25 and start the measurement of the rim of the eyeglass frame F. For example, in the present example, the measurement of the rim is started from the right rim FR. It is needless to say that the measurement may be started from the left rim FL.

For example, the controller 50 moves the holding unit 25 to move the optical measurement unit 30 (the light projecting optical system 30a and the light receiving optical system 30b) and the probe unit 60 and measure the rim contour of the eyeglass frame. In this manner, the cross-sectional shape of the groove of the rim of the eyeglass frame and the shape (in the present example, the spherical shape of the rim and the peripheral length) of the rim are acquired. In the present example, the light projecting optical system 30a and the light receiving optical system 30b are moved with respect to the eyeglass frame F in a state where the Scheimpflug relationship is maintained. In other words, the cross-sectional shape of the groove of the rim of the eyeglass frame F can be acquired by moving the optical measurement unit 30 so as to have a certain positional relationship with respect to the groove of the rim of the eyeglass frame F.

Figure 10:
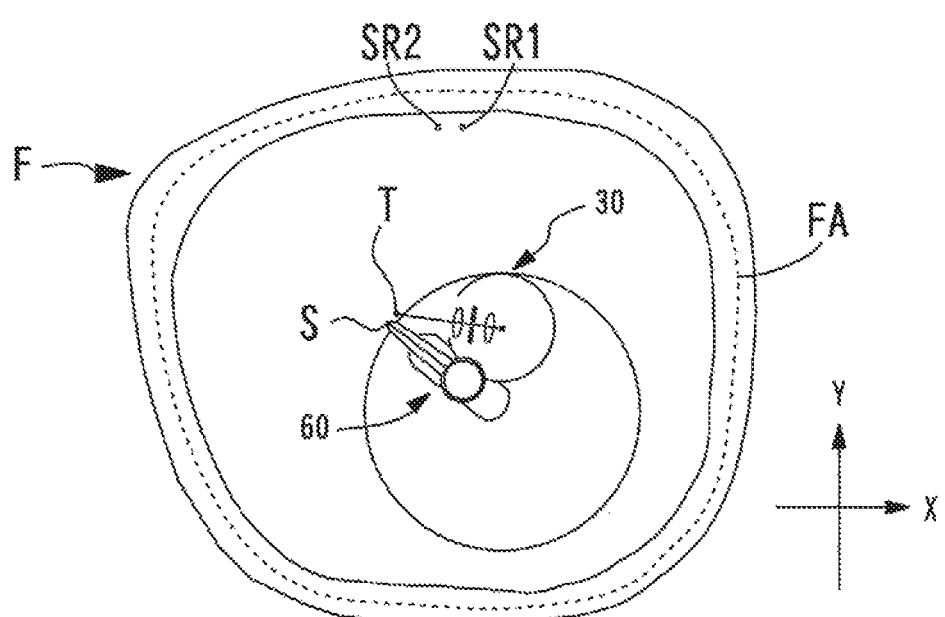
FIG. 10 is a view illustrating a state before the optical measurement unit and the probe unit are moved to an initial position.
Figure 11:
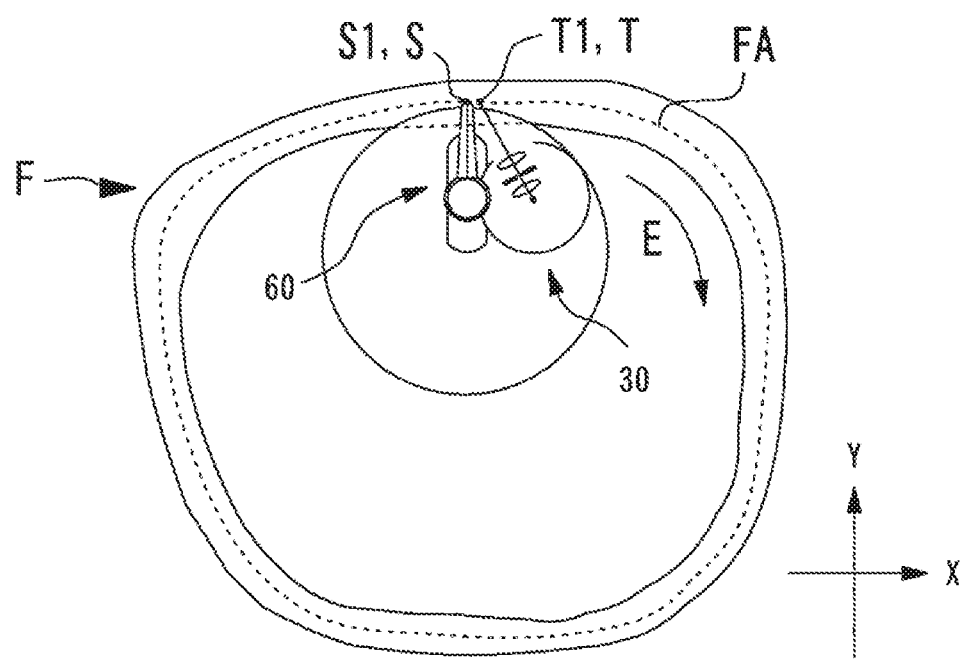
FIG. 11 is a view illustrating a state where the optical measurement unit and the probe unit are moved to the initial position and then moved to a measurement start position.

FIG. 10 is a view illustrating a state before the optical measurement unit 30 and the probe unit 60 are moved to an initial position. FIG. 11 is a view illustrating a state where the optical measurement unit 30 and the probe unit 60 are moved to the initial position and then moved to a measurement start position. In FIGS. 10 and 11, the light receiving optical system 30b is omitted for convenience.

For example, when the trigger signal for starting the measurement is output, the controller 50 controls driving of the movement unit 210 (at least one of the X movement unit 240, the Y movement unit 230, and the Z movement unit 220) and the rotation unit 260, and moves the holding unit 25 placed at a retracted position to the initial position. In the present example, an initial position SR1 of the optical measurement unit 30 and an initial position SR2 of the probe unit 60 are set respectively. In the present example, the measurement position S by the probe unit 60 is displaced from the measurement position T by the optical measurement unit 30 by the displacement amount ΔD (refer to FIG. 8). Therefore, the initial position SR1 of 30 and the initial position SR2 of the probe unit 60 are respectively set at positions separated from each other by the displacement amount ΔD in the X direction. In the present example, for example, the initial position SR1 for starting the measurement in the optical measurement unit 30 is set such that the holding unit 25 is at the center position of the clamp pins 130a and 130b and the clamp pins 131a and 131b on the lower end side of the right rim FR. In other words, the control is performed such that the first measurement position T by the optical measurement unit 30 is positioned at the above-described center position. At this time, the initial position S2 for starting the measurement by the probe unit 60 is set to a position displaced from the center position by the displacement amount ΔD in the direction opposite to the measurement proceeding direction. It is needless to say that the initial position can be set to any position.

For example, in the present example, by positioning the second measurement position S of the probe 61 of the probe unit 60 at the initial position SR1, the first measurement position of the optical measurement unit 30 is also positioned at the initial position SR1. In other words, since the optical measurement unit 30 is also moved by moving the second measurement position S of the probe 61 of the probe unit 60 to the initial position SR2, the first measurement position of the optical measurement unit 30 is positioned at the initial position SR1. It is needless to say that the direction of moving to the initial position is not limited to the above-described method.

For example, the controller 50 controls driving of at least one of the movement unit 210 and the rotation unit 260 to position the second measurement position S of the probe 61 at the initial position SR1. For example, the controller 50 rotates the rotation unit 260 at the initial position SR2 such that the tip of the probe 61 faces the upper side of the rim.

As illustrated in FIG. 11, for example, when the movement of the second measurement position S of the probe 61 to the initial position SR1 is completed, the controller 50 moves the holding unit 25 to the rim side such that the probe 61 comes into contact with the groove of the rim. Accordingly, the tip of the probe 61 is inserted into the groove of the rim, and the probe 61 is moved from the initial position SR2 to the measurement start position S1.

For example, when the controller 50 moves the second measurement position S of the probe 61 from the initial position SR2 to the measurement start position S1 and moves the first measurement position T of the optical measurement unit 30 from the initial position SR1 to the measurement start position T1, the light source 31 is turned on. For example, as the light source 31 is turned on, the groove of the rim of the eyeglass frame F is light-cut by the slit light. The reflected light flux from the groove of the rim of the eyeglass frame F light-cut by the slit light is directed to the light receiving optical system 30b and received by the detector 37. For example, the controller 50 acquires the two-dimensional cross-sectional shape of the groove of the rim of the eyeglass frame based on the reflected light flux received by the detector 37. In the present example, a cross-sectional image is acquired as the cross-sectional shape. It is needless to say that the cross-sectional shape may be acquired as a signal.

For example, the controller 50 moves the tip of the probe 61 along the groove FA of the rim. At this time, the controller 50 drives the motor 265 to rotate the rotation base 261 for each rotation angle (radius vector angle) and to rotate the probe shaft 62 and the probe 61 around the rotation axis LO. The probe 61 moves in the X direction, the Y direction, and the Z direction following the change in the groove of the rim. In the present example, the position of the probe 61 in the X direction and the Y direction at the time of tracing is detected by the encoder 286, and the position of the probe 61 in the Z direction at the time of tracing is detected by the encoder 288. In the present example, the tip of the probe 61 is moved in the measurement proceeding direction F along the groove FA of the rim.

For example, the controller 50 obtains the radial length from the reference position to the groove FA of the rim for each rotation angle (radius vector angle) of the rotation base 261. For example, in the present example, the rotation angle of the rotation base 261 is set every 0.36 degrees. Further, for example, in the present example, the reference position is set to the position of the rotation axis LO. For example, the radial length (rn) at a certain rotation angle (θn) of the rotation base 261 is calculated based on the rotation angle of the probe shaft 282 and the distance (known distance) from the rotation center to the tip of the probe 61. Further, for example, the controller 50 calculates at least one of the number of pulses of the motor 225, the number of pulses of the motor 235, the number of pulses of the motor 245, the detection result of the encoder 265a, the detection result of the encoder 286, and the detection result of the encoder 288 as the position of the groove of the rim, and stores the calculation result in the memory 52. For example, the controller 50 obtains the position of the groove of the rim in the X direction, the Y direction, and the Z direction for each rotation angle of the rotation base 261.

For example, by rotating the rotation base 261 once, three-dimensional spherical shape data (xn, yn, zn) (n=1, 2, 3, . . . , and N) of the groove of the rim is acquired. In the present example, such three-dimensional spherical shape data is represented by three-dimensional orthogonal coordinates. In the three-dimensional spherical shape data, the positions in the X and Y directions may be represented by two-dimensional polar coordinates by the rotation angle θn and the radial length rn, and the position in the Z direction may be appropriately converted to (rn, zn, θn) (n= 1, 2, 3, . . . , and N) represented by the Z coordinate. For example, the controller 50 causes the memory 52 to store the three-dimensional spherical shape data of the groove of the rim acquired as described above as the measurement result of the probe unit 60. For example, the controller 50 may omit the Z coordinate of the three-dimensional spherical shape data to make the two-dimensional spherical shape data. For example, the controller 50 acquires the two-dimensional spherical shape data that is two-dimensional by connecting the XY coordinates for each rotation angle θn in the three-dimensional spherical shape data, and stores the acquired data in the memory 52.

Meanwhile, the irradiation position of the measurement light flux with respect to the groove of the rim by the optical measurement unit 30 is changed together with the movement of the probe 61. In the present example, the measurement of the groove FA of the rim by the probe 61 and the measurement of the groove of the rim by the optical measurement unit 30 are performed in parallel. For example, as the probe 61 moves, the measurement position of the cross-sectional image of the groove of the rim by the optical measurement unit 30 is changed. For example, by moving the probe 61 along the groove FA of the rim, the cross-sectional images of the groove of the rim at each radius vector angle are sequentially measured. In other words, the position at which the cross-sectional image of the rim is acquired is moved in the peripheral direction of the rim.

For example, the controller 50 acquires the cross-sectional image of the groove of the rim and stores each of the acquired cross-sectional images in the memory 52 at each acquisition position (each measurement position) of the cross-sectional image. Further, the acquisition positions of each cross-sectional image are calculated from at least one of the number of pulses of the motor 225, the number of pulses of the motor 235, the number of pulses of the motor 245, the detection result of the encoder 265a, the detection result of the encoder 286, and the detection result of the encoder 288, and are stored in the memory 52. In other words, by acquiring at least one of the number of pulses of the motor 225, the number of pulses of the motor 235, the number of pulses of the motor 245, the detection result of the encoder 265a, the detection result of the encoder 286, and the detection result of the encoder 288, the position at which the cross-sectional image of the rim is acquired can be specified. In this manner, for example, the controller 50 can acquire the position (acquisition position information) at which the cross-sectional image of the groove of the rim is acquired. For example, the acquisition position information can be used when acquiring the three-dimensional cross-sectional image of the groove of the rim, the shape of the eyeglass frame, and the like.

For example, the controller 50 can acquire the cross-sectional image of the groove of the rim in the entire periphery of the rim by repeating the above-described control over the entire periphery of the rim. For example, when the acquisition of the cross-sectional image of the groove of the rim in the entire periphery of the rim is completed, the controller 50 calls the cross-sectional image of the entire periphery of the rim and the acquisition position information stored in the memory 52, performs calculation processing, and acquires the three-dimensional cross-sectional image. For example, the controller 50 stores the acquired three-dimensional cross-sectional image in the memory 52. In the present example, the configuration in which the three-dimensional cross-sectional image is acquired after the acquisition of the cross-sectional image in the entire periphery of the rim has been described as an example, but the present disclosure is not limited thereto. For each acquisition position of the cross-sectional images of the groove of the rim, the calculation processing may be performed every time the cross-sectional image is acquired.

In the present example, the imaging optical axis L2 of the light receiving optical system 30b is disposed to be inclined downward by the inclination angle α in the Z direction and inclined by the inclination angle θ on the XY plane with respect to the optical axis L1 of the light projecting optical system 30a. Further, for example, in the present example, the optical axis L1 of the light projecting optical system 30a in the optical measurement unit 30 is disposed to be inclined by the inclination angle β on the radial plane (XY plane) with respect to the measuring axis L3 extending from the probe 61 toward the measurement position of the groove of the rim of the eyeglass frame. In a case of the above-described configuration, for example, the controller 50 may correct the cross-sectional shape of the groove of the rim based on at least one of the inclination angle α, the inclination angle β, and the inclination angle θ. As an example, the controller 50 may correct the cross-sectional shape of the groove of the rim of the eyeglass frame by a trigonometric function using at least one of the inclination angle α, the inclination angle β, and the inclination angle θ. In this manner, by correcting the cross-sectional shape of the groove of the rim based on the inclination angle, it becomes possible to acquire the cross-sectional shape in which the distortion of the cross-sectional shape caused by the influence of the inclination angle is corrected, and the cross-sectional shape of the groove of the rim can be accurately acquired.

In a case where the reflected light flux of the groove of the rim is not excellently received by the detector 37 and the cross-sectional image cannot be acquired excellently, the controller 50 may change the light receiving position of the reflected light flux such that the reflected light flux of the groove of the rim is received by the detector 37. For example, the controller 50 may move the position of the optical measurement unit 30 such that the cross-sectional image is detected.

For example, when the tip of the probe 61 is moved along the groove FA of the rim, the position of the probe 61 may be moved while being adjusted based on the measurement result (for example, cross-sectional image) acquired by the optical measurement unit 30. In other words, since the measurement of the groove of the rim by the optical measurement unit 30 is performed before the measurement of the probe 61, based on the measurement result acquired in advance, predictive control can be performed such that the probe 61 does not fall out of the groove of the rim. In this case, for example, the controller 50 may perform image processing on the cross-sectional image acquired by the optical measurement unit 30, may detect the bottom of the groove of the rim, and based on the detected position of the bottom of the groove of the rim, may move the position of the probe 61 such that the probe 61 is inserted at the position of the bottom of the groove of the rim.

For example, when the measurement of the right rim FR (or left rim FL) is completed, the controller 50 controls the driving of the X movement unit 240 and moves the holding unit 25 to a predetermined position for the measurement of the other rim. The other rim is measured in the same manner as the above-described measurement control. The measurement result of the right rim FR and the left rim FL is stored in the memory 52.

For example, when the acquisition of the three-dimensional spherical shape data of the groove of the rim by the probe unit 60 and the acquisition of the three-dimensional cross-sectional image by the optical measurement unit are completed, the controller 50 may acquire the integrated rim shape data by associating the three-dimensional spherical shape data and the three-dimensional cross-sectional image with each other. For example, when performing the association process, the controller 50 may perform the association process in consideration of the displacement of the measurement position based on the displacement amount ΔD between the first measurement position T and the second measurement position S. Accordingly, it is possible to easily associate the three-dimensional spherical shape data and the three-dimensional cross-sectional image with each other. For example, when the integrated rim shape data is acquired, the controller 80 stores the acquired integrated rim shape data in the memory 52.

As described above, the integrated rim shape data of the groove of the rim which is acquired by the eyeglass frame shape measurement device 1 is transmitted to the lens processing device 300 by the controller 50. For example, the controller 310 of the lens processing device 300 receives the integrated rim shape data and the like of the groove of the rim which is acquired by the eyeglass frame shape measurement device 1.

For example, the lens processing device 300 includes a lens rotating means for rotating while holding the lens on a lens chuck shaft, and a processing tool rotating means for rotating the processing tool attached to a processing tool rotation axis. For example, in the lens processing device 300, the controller 310 of the lens processing device controls the lens rotating means and the processing tool rotating means based on the acquired information (for example, the integrated rim shape data of the groove of the rim of the eyeglass frame) acquired by the eyeglass frame shape measurement device 1, and processes the peripheral edge of the lens. The controller 310 of the lens processing device may be configured such that the controller of the eyeglass frame shape measurement device 1 is also used, or the controller 310 for performing various controls of the lens processing device may be provided separately.

In the present example, the integrated rim shape data may be displayed on the display 3. It is needless to say that the display may be performed on a display (not illustrated) of the lens processing device 300. In this case, for example, the three-dimensional spherical shape data and the three-dimensional cross-sectional image which are included in the integrated rim shape data may be displayed in a superimposed manner.

In this manner, for example, in the present example, the eyeglass frame shape measurement device includes the holding unit that holds the optical measurement unit and the probe unit, the changing portion that integrally moves the optical measurement unit and the probe unit with respect to the eyeglass frame by moving the holding unit with respect to the eyeglass frame, to change the measurement position with respect to the groove of the rim of the eyeglass frame, and the controller that controls the operation of the eyeglass frame shape measurement device. Further, the controller controls an operation of the changing portion to measure the groove of the rim of the eyeglass frame, acquires the cross-sectional shape of the groove of the rim of the eyeglass frame based on the detection result detected by the first detector, and acquires the shape of the rim of the eyeglass frame based on the detection result detected by the second detector. With such a configuration, for example, compared to a configuration in which a holding unit that holds the probe unit and a holding unit that holds the optical measurement unit are respectively provided and the holding units are respectively movable with respect to the eyeglass frame, an extra configuration or complicated control becomes unnecessary since it is possible to integrally move the optical measurement unit and the probe unit with respect to the eyeglass frame by moving the holding unit which is one unit. Accordingly, it is possible to perform the measurement of the optical measurement unit and the probe unit with a simple configuration. In addition, since it is possible to acquire both the measurement result measured by the probe unit and the measurement result measured by the optical measurement unit, it is possible to combine each measurement result to acquire more excellent rim shape information.

Further, for example, in the present example, the eyeglass frame shape measurement device includes the movement portion that makes the probe movable with respect to the holding unit. In this case, for example, as the optical measurement unit is connected to the probe unit and the probe is moved with respect to the holding unit, the optical measurement unit may be integrally moved together with the probe with respect to the holding unit. In this manner, for example, compared to a configuration in which the probe unit and the optical measurement unit are respectively movable with respect to the holding unit, by connecting the optical measurement unit to the probe unit, an extra configuration or complicated control becomes unnecessary, and it is possible to make the eyeglass frame shape measurement device a device having a simpler configuration. Further, compared to a configuration in which the probe unit and the optical measurement unit are respectively movable with respect to the holding unit, by connecting the optical measurement unit to the probe, it is possible to save space. Therefore, it is possible to prevent the probe unit and the optical measurement unit from interfering with each other during the measurement of the eyeglass frame and making the measurement difficult.

Further, for example, in a case of the optical measurement unit, since the measurement is performed without coming into contact with the groove of the rim, there is a case where it becomes difficult to align the optical measurement unit with the groove of the rim. With the above configuration, for example, the optical measurement unit can move integrally with the movement of the probe that moves along the groove of the rim, and thus, it becomes easy to align the optical measurement unit with the groove of the rim, and it is possible to excellently perform the measurement.

Further, in the present example, for example, the probe unit and the optical measurement unit are disposed such that a first measurement position which is a measurement position of the groove of the rim by the optical measurement unit and a second measurement position which is a measurement position of the groove of the rim by the probe unit are measurable as different measurement positions. With such a configuration, the optical measurement unit and the probe unit measure different measurement positions at the same timing. For example, in a case where the probe unit and the optical measurement unit simultaneously measure the same measurement position, the measurement light flux from the optical measurement unit may be blocked by the probe, and there is a case where the measurement by the optical measurement unit becomes difficult. According to the configuration of the present disclosure, since the probe unit and the optical measurement unit can measure different measurement positions, it is possible to prevent blocking of the measurement light flux by the probe, and to excellently perform the measurement.

Further, in the present example, the probe unit and the optical measurement unit are disposed such that the first measurement position which is a measurement position of the groove of the rim by the optical measurement unit and the second measurement position which is a measurement position of the groove of the rim by the probe unit are measured as adjacent measurement positions. With such a configuration, for example, the optical measurement unit and the probe unit can measure closer (adjacent) measurement positions. For example, in a case where the measurement position between the optical measurement unit and the probe unit is largely displaced, there is a case where the measurement becomes difficult. As an example, for example, when one of the optical measurement unit and the probe unit approaches a curved part (for example, the nose side part and the ear side part) of the eyeglass frame, the other one is positioned above or below the eyeglass frame. In this cases, there is a case where the measurement cannot proceed and the measurement becomes difficult. According to the configuration of the present disclosure, it becomes possible to measure the measurement position by the optical measurement unit and the measurement position by the probe unit as closer (adjacent) measurement positions, and thus it becomes possible to prevent the measurement from becoming difficult, and to excellently perform the measurement.

Further, for example, in a case where the measurement position between the optical measurement unit and the probe unit is largely displaced, there is a case where it becomes difficult to associate the measurement results acquired by the optical measurement unit and the probe unit, respectively. As an example, there is a configuration in which the groove of the rim is partially inclined depending on the type of the eyeglass frame. In a case of measuring such an eyeglass frame, there is a case where one of the optical measurement unit and the probe unit measures the position at which the groove of the rim is inclined and the other one measures the position at which the groove of the rim is not inclined, and it becomes difficult to grasp which groove of the rim is being measured in the eyeglass frame. Therefore, in a case where the measurement results are acquired by both the optical measurement unit and the probe unit, it becomes difficult to grasp the relationship between the measurement results of both the optical measurement unit and the probe unit, and there is a case where the association becomes difficult. According to the configuration of the present disclosure, since it becomes possible to measure the measurement position by the optical measurement unit and the measurement position by the probe unit as closer (adjacent) measurement positions, it is possible to acquire the measurement result at substantially the same measurement position, and it becomes easy to grasp the relationship between the measurement results of both the optical measurement unit and the probe unit. Therefore, the respective measurement results acquired by the optical measurement unit and the probe unit can be excellently associated with each other.

Further, for example, in the present example, the first measurement position of the optical measurement unit is a measurement position preceding the second measurement position by the probe unit in the measurement proceeding direction. With such a configuration, for example, since the information of the measurement position measured by the probe is acquired from the measurement result by the optical measurement unit in advance, in a case where the measurement is performed by the probe unit with respect to the measurement position at which the measurement is completed by the optical measurement unit, it becomes easy to adjust the position of the probe with respect to the eyeglass frame based on the measurement result by the optical measurement unit. Accordingly, it is possible to prevent the probe from coming out of the groove of the eyeglass frame, and to prevent the probe from being measured in a state of not being accurately inserted in the groove of the rim.

For example, since the cross-sectional shape of the groove of the rim can be acquired in the measurement by the optical measurement unit, the state (for example, the inclination of the groove, and the depth of the groove) of the groove of the rim is easily grasped. Therefore, it is easy to more excellently perform the position adjustment with respect to the eyeglass frame compared to the configuration in which the position of the optical measurement unit is adjusted based on the measurement result of the probe unit.

Further, for example, in the present example, the optical axis of the light projecting optical system in the optical measurement unit is disposed to be inclined on the radial plane with respect to the measuring axis extending from the probe toward the measurement position of the groove of the rim of the eyeglass frame. With such a configuration, for example, it becomes easy to set the measurement position by the probe unit and the measurement position by the optical measurement unit as adjacent positions or the same position. Further, for example, compared to a configuration in which the measuring axis of the probe unit and the optical axis of the light projecting optical system in the optical measurement unit are disposed in parallel, it becomes easier to set the measurement position by the probe unit and the measurement position by the optical measurement unit as adjacent positions.

Further, for example, in the present example, the controller associates the cross-sectional shape of the groove of the rim and the shape of the rim with each other, which are acquired by measuring the measurement positions which are the same measurement position with respect to the groove of the rim of the eyeglass frame, based on first position information on the measurement position by the optical measurement unit and second position information on the measurement position by the probe. With such a configuration, it becomes possible to easily associate the measurement result measured by the probe unit and the measurement result measured by the optical measurement unit with each other, and it is possible to acquire more excellent rim shape information.

Further, for example, in the present example, the lens processing device includes a processing controller for processing the peripheral edge of the lens based on the cross-sectional shape of the groove of the rim of the eyeglass frame. Accordingly, when the processed lens is excellently framed into the eyeglass frame, the shape of the groove of the rim and the contour shape of the processed lens are close to each other, and thus, the framing can be excellently performed.

Transformation Example

Figure 12:
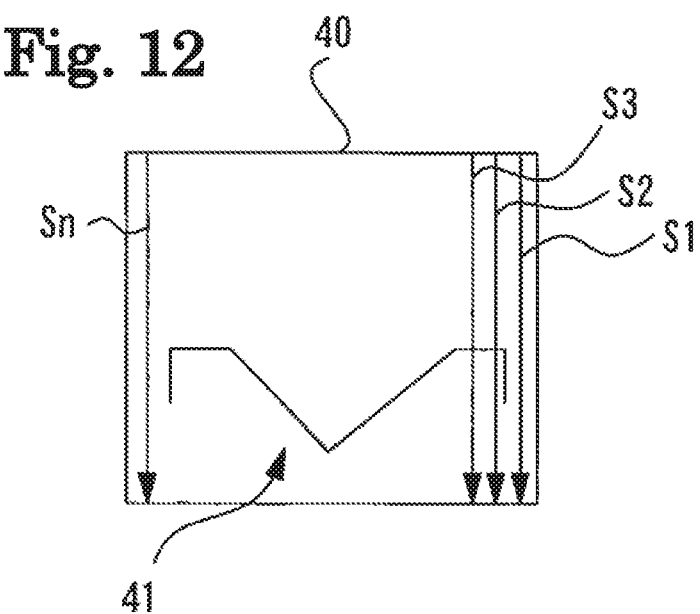
FIG. 12 is a view for describing acquisition of luminance distribution for a cross-sectional image.
Figure 13:
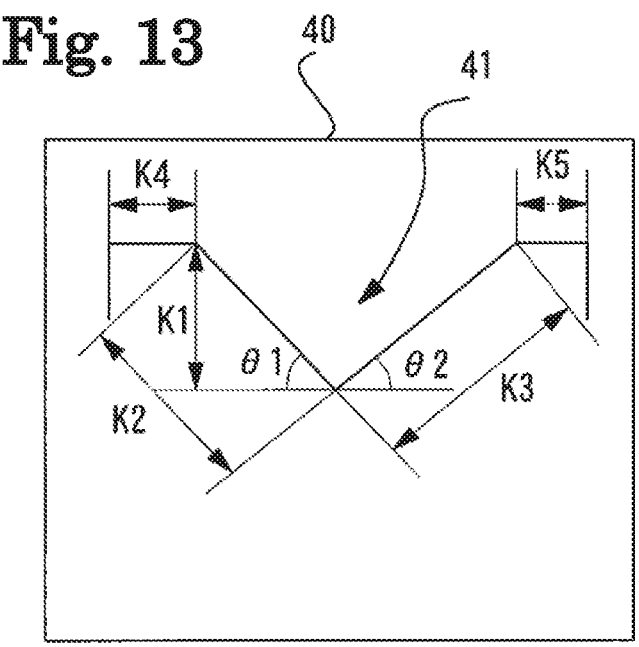
FIG. 13 is a view for describing parameters acquired from the cross-sectional image of a groove of a rim of an eyeglass frame.

For example, the controller 50 may acquire various parameters related to a groove of a rim of an eyeglass frame by performing analysis processing with respect to the acquired cross-sectional image. FIG. 12 is a view describing acquisition of luminance distribution for a cross-sectional image 40. FIG. 13 is a view describing parameters acquired from the cross-sectional image of a groove of a rim. For example, the controller 50 can acquire the parameters of a groove 41 of the rim by acquiring the luminance distribution of the cross-sectional image 40 by image processing. For example, the controller 50 detects the luminance value in the order of a scanning line S1, a scanning line S2, a scanning line S3, . . . , and a scanning line Sn with respect to the acquired cross-sectional image 40, and obtains the luminance distribution. For example, the shape of the groove of the rim can be detected by acquiring the luminance distribution. For example, as the parameters of the groove 41 of the rim, the controller 50 can obtain a distance K1 to the bottom of the groove 41 of the rim, left and right slope angles θ1 and θ2 of the groove 41 of the rim, left and right slope lengths K2 and K3 of the groove 41 of the rim, lengths K4 and K5 of the left and right rim shoulders, and the like.

For example, the controller 50 can acquire the shape data (the spherical shape data in the present example) of the eyeglass frame from the acquired cross-sectional image. For example, the controller 50 detects the bottom of the groove 41 of the rim at each of the plurality of radius vector angles of the eyeglass frame from the cross-sectional image 40 of the groove 41 of the rim at the plurality of radius vector angles of the eyeglass frame, and acquires the shape of the rim of the eyeglass frame based on the detected detection result.

For example, as described above, the controller 50 detects the position of the bottom of the groove 41 of the rim by acquiring the luminance distribution of the cross-sectional image by the image processing. As illustrated in FIG. 12, for example, the controller 50 detects the luminance value in the order of the scanning line S1, the scanning line S2, the scanning line S3, . . . , and the scanning line Sn with respect to the acquired cross-sectional image 40, and obtains the luminance distribution. For example, the controller 50 may detect the position at which the luminance value is detected at the lowest position in the obtained luminance distribution as the bottom of the groove 41 of the rim.

For example, the controller 50 processes each of the cross-sectional images acquired for each radius vector angle, and detects each position of the bottom of the groove of the rim on the image. For example, the controller 50 acquires the position information of the bottom of the groove of the rim from the position of the bottom of the groove of the rim on the image detected from the cross-sectional image and the acquired position information acquired from the cross-sectional image. For example, the controller 50 detects the position of the bottom of the groove of the rim on the image from the cross-sectional images acquired for each radius vector angle, and acquires each piece of position information of the bottom of the groove of the rim for each radius vector angle from the position of the bottom of the groove of the rim on the detected image and the acquisition position information obtained by acquiring the cross-sectional image. Accordingly, for example, the controller 50 acquires the three-dimensional spherical shape data (rn, zn, θn) (n=1, 2, 3, . . . , and N) of the eyeglass frame F. For example, the three-dimensional spherical shape data of the eyeglass frame Fn may be acquired over the entire periphery of the rim, or may be acquired in a partial region of the entire periphery of the rim. As described above, the shape of the eyeglass frame F can be acquired.

For example, various parameters may be acquired based on the acquired three-dimensional spherical shape data of the eyeglass frame. For example, the two-dimensional spherical shape data may be acquired from the three-dimensional spherical shape data of the eyeglass frame. For example, the two-dimensional spherical shape data can be acquired by making a shape obtained by projecting the three-dimensional spherical shape data onto the XY plane in the front direction of the eyeglass frame F. As the two-dimensional spherical shape data, a configuration for acquiring the three-dimensional spherical shape data has been described as an example, but the present disclosure is not limited thereto. When acquiring the position information of the bottom of the groove of the rim based on the cross-sectional image of the rim at each radius vector angle, the position information may be acquired by detecting only the position information of the bottom of the groove of the rim on the XY plane.

In the present example, a configuration in which the three-dimensional spherical shape data of the eyeglass frame is acquired by acquiring the position information of the bottom of the groove of the rim for each radius vector angle has been described as an example, but the present disclosure is not limited thereto. For example, when acquiring the three-dimensional spherical shape data of the eyeglass frame, at each radius vector angle, with respect to the position at which the position information of the bottom of the groove of the rim is not acquired, the position information of the bottom of the groove of the rim may be acquired by interpolation based on the position information of the bottom of the groove of the rim at the radius vector angle of the periphery. For example, when acquiring the three-dimensional spherical shape data of the eyeglass frame, at each radius vector angle, with respect to the position at which the position information of the bottom of the groove of the rim is not acquired, the result of approximation of the position information of the bottom of the groove of the rim at the radius vector angle of the periphery may be interpolated.

1 eyeglass frame shape measurement device
3 display
4 switch unit
10 frame holding unit
20 measurement unit
25 holding unit
30 optical measurement unit
30a light projecting optical system
30b light receiving optical system
31 light source
37 detector
50 controller
52 memory
60 probe unit
61 probe
62 probe shaft
210 movement unit
220 Z movement unit
230 Y movement unit
240 X movement unit
260 rotation unit
300 lens processing device
310 controller

What is claimed is:
1. An eyeglass frame shape measurement device that measures a shape of an eyeglass frame, comprising:
an optical measurement unit including a light projecting optical system that emits a measurement light flux from a light source toward a groove of a rim of an eyeglass frame, and a light receiving optical system that causes a first detector to receive a reflected light flux of the measurement light flux emitted toward the groove of the rim of the eyeglass frame by the light projecting optical system and reflected by the groove of the rim of the eyeglass frame;

a probe unit including a probe to be pressed against the groove of the rim of the eyeglass frame and a second detector that detects a position of the probe;

a holding unit that holds the optical measurement unit and the probe unit;

a changing portion that includes an actuator and drives the actuator to integrally move the optical measurement unit and the probe unit with respect to the eyeglass frame by moving the holding unit with respect to the eyeglass frame, to change a measurement position with respect to the groove of the rim of the eyeglass frame; and a controller that controls an operation of the eyeglass frame shape measurement device, wherein the controller controls an operation of the changing portion to measure the groove of the rim of the eyeglass frame, acquires a cross-sectional shape of the groove of the rim of the eyeglass frame based on a detection result detected by the first detector, and acquires a shape of the rim of the eyeglass frame based on a detection result detected by the second detector.

2. The eyeglass frame shape measurement device according to claim 1, further comprising:

a movement portion that moves the probe with respect to the holding unit, wherein the optical measurement unit is integrally moved together with the probe with respect to the holding unit as the optical measurement unit is connected to the probe unit and the probe is moved with respect to the holding unit by the movement portion.

3. The eyeglass frame shape measurement device according to claim 1, wherein the probe unit and the optical measurement unit are disposed such that a first measurement position which is a measurement position of the groove of the rim by the optical measurement unit is different from a second measurement position which is a measurement position of the groove of the rim by the probe unit.

4. The eyeglass frame shape measurement device according to claim 3, wherein the probe unit and the optical measurement unit are disposed such that the first measurement position is adjacent to the second measurement position.

5. The eyeglass frame shape measurement device according to claim 3, wherein the first measurement position by the optical measurement unit is a measurement position preceding the second measurement position by the probe unit in a measurement proceeding direction.

6. The eyeglass frame shape measurement device according to claim 1, wherein an optical axis of the light projecting optical system in the optical measurement unit is disposed to be inclined on a radial plane with respect to a measuring axis extending from the probe toward a measurement position of the groove of the rim of the eyeglass frame.

7. The eyeglass frame shape measurement device according to claim 1, wherein the controller associates the cross-sectional shape of the groove of the rim with the shape of the rim based on first position information regarding a measurement position by the optical measurement unit and second position information regarding a measurement position by the probe unit, and the associated cross-sectional shape of the groove of the rim and the associated shape of the rim are acquired by measuring at an identical measurement position with respect to the groove of the rim of the eyeglass frame.

8. A lens processing device that processes a peripheral edge of a lens, comprising:

a processing controller that processes a peripheral edge of a lens based on a cross-sectional shape of a groove of a rim of an eyeglass frame and a shape of the rim, which are acquired by the eyeglass frame shape measurement device according to claim 1.

* * * * *